US008123603B2

(12) United States Patent
Yoshizawa

(10) Patent No.: US 8,123,603 B2
(45) Date of Patent: Feb. 28, 2012

(54) GAMING MACHINE ALLOWING PLAYER TO SELECT DEALER AND CONTROL METHOD THEREOF

(75) Inventor: Kazumasa Yoshizawa, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 578 days.

(21) Appl. No.: 12/335,020

(22) Filed: Dec. 15, 2008

(65) Prior Publication Data

US 2009/0318222 A1 Dec. 24, 2009

Related U.S. Application Data

(60) Provisional application No. 61/038,948, filed on Mar. 24, 2008.

(51) Int. Cl.
*A63F 13/10* (2006.01)

(52) U.S. Cl. ........................................ 463/11; 463/20

(58) Field of Classification Search .............. 463/11–13, 463/20–22
See application file for complete search history.

(56) References Cited

U.S. PATENT DOCUMENTS 6,007,424 A 12/1999 Evers et al.
2006/0009283 A1 1/2006 Englman et al.
2006/0084505 A1 4/2006 Yoseloff et al.
2006/0287043 A1 12/2006 Englman et al.
2008/0167103 A1 * 7/2008 Okada ............................ 463/11

* cited by examiner

*Primary Examiner* — Thomas L Dickey
(74) *Attorney, Agent, or Firm* — NDQ&M Watchstone LLP

(57) ABSTRACT

A gaming machine of the present invention displays a dealer image selected from a plurality of types of dealer images to a display, and offers a profit (e.g. a game support advantageous for the player) in accordance with the dealer image to a station where an additional BET has been placed. Then, the gaming machine calculates and compares a total number of BETs in each station over a unit number of games, and accepts a selection of a dealer image at the station where the total number of BETs is the largest.

9 Claims, 18 Drawing Sheets

GAMING MACHINE ALLOWING PLAYER TO SELECT DEALER AND CONTROL METHOD THEREOF

CROSS-REFERENCE TO RELATED APPLICATIONS

This application claims benefit of priority based on U.S. Provisional Patent Application No. 61/038,948 filed on Mar. 24, 2008. The contents of this application are incorporated herein by reference in their entirety.

BACKGROUND OF THE INVENTION

Field of the Invention

The present invention relates to a gaming machine allowing a player to select a dealer, and a control method thereof.

Conventionally, there have been installed in casinos, gaming facilities, and the like, card game machines and tables for playing card games in which a dealer and a plurality of players join, such as Poker having a variety of gaming methods including Pai Gow Poker, Holdem Poker and 7 Stad Poker; Bakkarat; and Blackjack.

For example, in U.S. Pat. No. 6,007,424 and US 2006/0084505-A1, a table and a card game machine for playing Pai Gow Poker are described.

Further, as disclosed in US 2006/0287043-A1 and US 2006/0009283-A1, there exists a game system in which a plurality of gaming machines (player terminals) are linked and a plurality of players are able to play a common game.

In some of the conventional gaming machines and playing methods of card games, a game is played while displaying a dealer image to a display for the purpose of improving a realism of the game. However, the displayed dealer image has always been an image of the same type, namely, an image representing the same person in the same costume. Further, although changes in dealer and his or her costume have been made, the dealer and his or her costume after the change have been determined at random or by a lottery.

Therefore, in the conventional art, the player has no selection of the dealer and his or her costume, whereby it has not been possible not only to reflect a player's request for optional change of the dealer image, but also to use the request for motivating the player to place a further BET.

Under such circumstances, there have been developed a gaming machine allowing a player to select a dealer image to be displayed to a display. In such a gaming machine, a player playing a game at a player terminal having satisfied a predetermined condition can select a dealer image to be displayed during a next game.

However, in such a gaming machine, even though the dealer image is selected, such a dealer image is used in the game only in an effect for proceeding with the game. Therefore, for the player, selecting the dealer image is merely for displaying his or her favorite image to the display, and hence the player may gradually become tired of the game.

The present invention was made in view of the foregoing problems, and has an object to provide a gaming machine that displays a dealer image offering a profit to a player, and a control method thereof.

The contents of U.S. Pat. No. 6,007,424, US 2006/0084505-A1, US 2006/0287043-A1, and US 2006/0009283-A1 are incorporated herein by reference in their entirety.

SUMMARY OF THE INVENTION

A first aspect of the present invention provides a gaming machine having the following configuration.

Namely, the gaming machine comprises: a display capable of displaying an image; a plurality of stations each having an input device and being arranged at a position from which the display is visible to a player playing a game; a memory storing a plurality of types of dealer image data each showing a dealer image; and a controller. The controller is programmed so as to execute the processing of (a) displaying the dealer image selected from a plurality of types of the dealer images to the display based on the dealer image data stored in the memory, (b) accepting a normal BET from the input device provided in each of the stations, (c) accepting an additional BET different from the normal BET, from the input device provided in each of the stations, (d) offering a normal payout, after executing the game, based on a result of the game and the normal BET, (e) offering a profit in accordance with the dealer image displayed to the display in the station where the additional BET has been placed, (f) calculating in each of the stations a total number of BETs as a sum of a number of normal BETs and a number of additional BETs over a predetermined unit number of the games, and (g) accepting an input for selecting the dealer image to be displayed to the display from the input device provided in the station where the total number of BETs is the largest as a result of a comparison of the total number of BETs at each of the stations calculated in the processing (f).

According to the above gaming machine, a dealer image selected from a plurality of types of dealer images is displayed to a display, and a profit (e.g. a game support advantageous for the player) in accordance with the dealer image is offered to a station where an additional BET has been placed. Then, a total number of BETs in each station over a unit number of games is calculated and compared. A selection of a dealer image is accepted at the station where the total number of BETs is the largest.

Namely, the player having placed the largest amount of BETs over the unit number of games can select the dealer image to be displayed to the display. Therefore, it is possible to have the player who wishes to select the dealer image consume many game media.

Further, when the additional BET is placed separately from the normal BET, the profit in accordance with the dealer image displayed to the display at that time is offered to the station where the additional BET has been placed. This can motivate the player to place the additional BET. Consequently, it is possible to have the player consume more game media.

As thus described, since the player can play a game against the dealer selected by his or her own choice, or receive a profit from the dealer on whom the player has placed the additional BET, it is possible to have the player emotionally attached to the dealer, so as to make the game more interesting. Further, the player capable of placing a large amount of BET can feel superior to other players.

Further, it is desirable that the above-mentioned gaming machine has the following configuration.

Namely, the processing (g) is processing of accepting the input for selecting the dealer image to be displayed to the display from the input device provided in the station where the total number of BETs is the largest as a result of the comparison of the total number of BETs at each of the stations calculated in the processing (f), out of the stations where the additional BETs have been placed during the predetermined unit number of games.

According to the above gaming machine, the player having placed the additional BET over the unit number of games and having placed the largest amount of BET during the games can select the dealer image to be displayed to the display. It is therefore possible to grant a selection of the dealer image accurately to the player interested in receiving the profit from the dealer, while motivating the player to place the additional BET.

Further, it is desirable that the above-mentioned gaming machine has the following configuration.

Namely, the controller is further programmed so as to execute the processing of (h) cumulatively accumulating a predetermined percentage of additional-bet game media in association with the dealer image displayed to the display, and (i) offering a special payout, at the station having satisfied a condition determined for each of the plurality of types of the dealer images, from game media cumulatively accumulated in association with the dealer image for which the condition is determined.

According to the gaming machine, part of additionally bet game media is cumulatively accumulated for each dealer image, and a special payout is offered to the player having satisfied a condition determined for each dealer image from the game media accumulated in association with the dealer image. It is therefore possible to have the player absorbed in satisfying the condition of each dealer, and further to have the player consume more game media for obtaining the selection of the dealer from the inclination to satisfy conditions determined for all the dealer images.

A second aspect of the present invention provides a gaming machine having the following configuration.

Namely, the gaming machine comprises: a display capable of displaying an image; a plurality of stations each having an input device and being arranged at a position from which the display is visible to a player playing a game; a memory storing a plurality of types of dealer image data each showing a dealer image; and a controller. The controller is programmed so as to execute the processing of (a) displaying the dealer image selected from a plurality of types of the dealer images to the display based on the dealer image data stored in the memory, (b) accepting a normal BET from the input device provided in each of the stations, (c) accepting an additional BET different from the normal BET from the input device provided in each of the stations, (d) offering a normal payout, after executing the game, based on a result of the game and the normal BET, (e) offering a profit in accordance with the dealer image displayed to the display in the station where the additional BET has been placed, (f) calculating in each of the stations a total number of losses obtained by subtracting a total number of payouts as a total amount of game media offered over a predetermined unit number of games from a total number of BETs as sum of a number of normal BETs and a number of additional BETs over the predetermined unit number of games, and (g) accepting an input for selecting the dealer image to be displayed to the display from the input device provided in the station where the total number of losses is the largest as a result of a comparison of the total number of losses at each of the stations calculated in the processing (f).

According to the above gaming machine, a dealer image selected from a plurality of types of dealer images is displayed to a display, and a profit (e.g. a game support advantageous for the player) in accordance with the dealer image is offered to a station where an additional BET has been placed. Then, a total number of losses (difference between the total number of BETs and the total number of payouts) in each station over a unit number of games is calculated and compared. A selection of a dealer image is accepted at the station where the total number of losses is the largest.

Namely, the player having incurred the largest amount of loss over the unit number of games can select the dealer image to be displayed to the display. It is therefore possible to relieve the player having incurred a large amount of loss, so as to prevent the player having incurred the large amount of loss from losing an interest and a motivation to play the game.

Further, when the additional BET is placed separately from the normal BET, the profit in accordance with the dealer image displayed to the display at that time is offered to the station where the additional BET has been placed. This can motivate the player to place the additional BET. Consequently, it is possible to have the player consume more game media.

As thus described, since the player can play a game against the dealer selected by his or her own choice, or receive a profit from the dealer on whom the player has placed the additional BET, it is possible to have the player emotionally attached to the dealer, so as to make the game more interesting.

Further, it is desirable that the above-mentioned gaming machine has the following configuration.

Namely, the processing (g) is processing of accepting the input for selecting the dealer image to be displayed to the display from the input device provided in the station where the total number of losses is the largest as a result of the comparison of the total number of losses at each of the stations calculated in the processing (f), out of the stations where the additional BETs have been placed during the predetermined unit number of games.

According to the above gaming machine, the player having placed the additional BET over the unit number of games and having been incurred the largest amount of losses during the games can select the dealer image to be displayed to the display. It is therefore possible to grant a selection of the dealer image accurately to the player interested in receiving the profit from the dealer, while motivating the player to place the additional BET.

Further, it is desirable that the above-mentioned gaming machine has the following configuration.

Namely, the controller is further programmed so as to execute the processing of (h) cumulatively accumulating a predetermined percentage of additional-bet game media in association with the dealer image displayed to the display, and (i) offering a special payout, at the station having satisfied a condition determined for each of the plurality of types of the dealer images, from game media cumulatively accumulated in association with the dealer image for which the condition is set.

According to the gaming machine, part of additionally bet game media is cumulatively accumulated for each dealer image, and a special payout is offered to the player having satisfied a condition determined for each dealer image from the game media accumulated in association with the dealer image. It is therefore possible to have the player absorbed in satisfying the condition of each dealer.

A third aspect of the present invention provides a control method of a gaming machine, the control method having the following configuration.

Namely, the control method of a gaming machine, the playing method comprising the steps of: (a) displaying a dealer image selected from a plurality of types of the dealer images to a display based on dealer image data showing the dealer image, the dealer image data being stored in a memory; (b) accepting a normal BET from an input device provided in each station arranged at a position from which the display is visible to a player playing a game; (c) accepting an additional BET different from the normal BET, from the input device provided in each of the stations; (d) offering a normal payout, after executing the game, based on a result of the game and the normal BET; (e) offering a profit in accordance with the dealer image displayed to the display in the station where the additional BET has been placed; (f) calculating in each of the stations a total number of BETs as a sum of a number of normal BETs and a number of additional BETs over a predetermined unit number of the games; and (g) accepting an input for selecting the dealer image to be displayed to the display from the input device provided in the station where the total number of BETs is the largest as a result of a comparison of the total number of BETs at each of the stations calculated in the step (f).

According to the control method of the gaming machine, a dealer image selected from a plurality of types of dealer images is displayed to a display, and a profit (e.g. a game support advantageous for the player) in accordance with the dealer image is offered to a station where an additional BET has been placed. Then, a total number of BETs in each station over a unit number of games is calculated and compared. A selection of a dealer image is accepted at the station where the total number of BETs is the largest.

Namely, the player having placed the largest amount of BETs over the unit number of games can select the dealer image to be displayed to the display. Therefore, it is possible to have the player who wishes to select the dealer image consume many game media.

Further, when the additional BET is placed separately from the normal BET, the profit in accordance with the dealer image displayed to the display at that time is offered to the station where the additional BET has been placed. This can motivate the player to place the additional BET. Consequently, it is possible to have the player consume more game media.

As thus described, since the player can play a game against the dealer selected by his or her own choice, or receive a profit from the dealer on whom the player has placed the additional BET, it is possible to have the player emotionally attached to the dealer, so as to make the game more interesting. Further, the player capable of placing a large amount of BET can feel superior to other players.

Further, it is desirable that the above-mentioned control method of a gaming machine has the following configuration.

Namely, the step (g) is a step of accepting the input for selecting the dealer image to be displayed to the display from the input device provided in the station where the total number of BETs is the largest as a result of the comparison of the total number of BETs at each of the stations calculated in the step (f), out of the stations where the additional BETs have been placed during the predetermined unit number of games.

According to the control method of the gaming machine, the player having placed the additional BET over the unit number of games and having placed the largest amount of BET during the games can select the dealer image to be displayed to the display. It is therefore possible to grant a selection of the dealer image accurately to the player interested in receiving the profit from the dealer, while motivating the player to place the additional BET.

Further, it is desirable that the above-mentioned control method of a gaming machine has the following configuration.

Namely, the control method further including the step of: (h) cumulatively accumulating a predetermined percentage of additional-bet game media in association with the dealer image displayed to the display; and (i) offering a special payout, at the station having satisfied a condition determined for each of the plurality of types of the dealer images, from game media cumulatively accumulated in association with the dealer image for which the condition is set.

According to the control method of the gaming machine, part of additionally bet game media is cumulatively accumulated for each dealer image, and a special payout is offered to the player having satisfied a condition determined for each dealer image from the game media accumulated in association with the dealer image. It is therefore possible to have the player absorbed in satisfying the condition of each dealer, and further to have the player consume more game media for obtaining the selection of the dealer from the inclination to satisfy conditions determined for all the dealer images.

BRIEF DESCRIPTIONS OF THE DRAWINGS

DESCRIPTION OF THE EMBODIMENTS

Figure 1A:
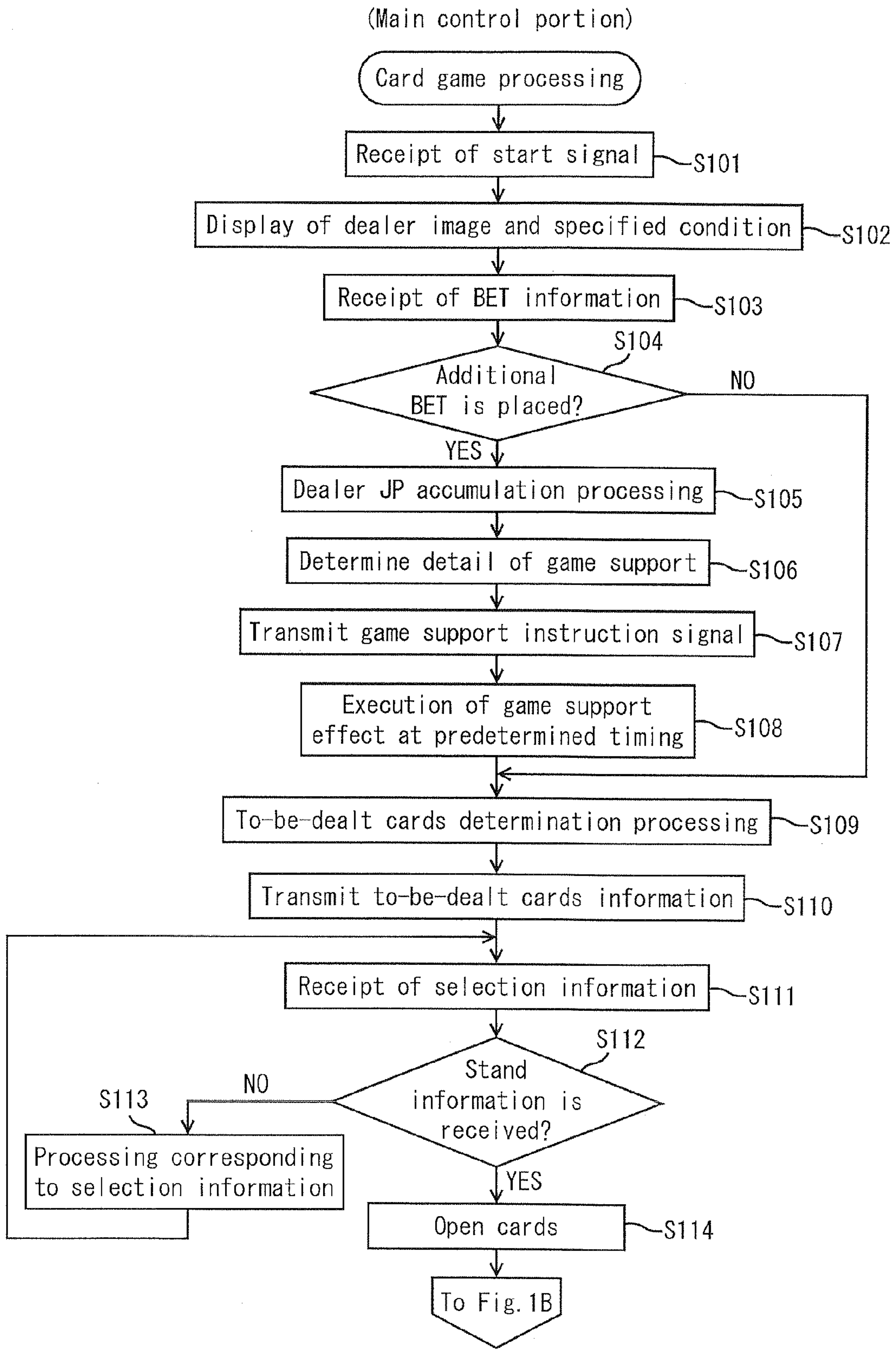
FIG. 1A is a flowchart showing card game processing executed in a main control portion provided in a gaming machine according to one embodiment of the present invention.

An embodiment of the present invention is described based on drawings.

In the following embodiment, the case of playing Blackjack is described. First, the rule of Blackjack is described.

In Blackjack, a dealer and a single or a plurality of players play a game against each other, using a deck of playing cards (52 cards). Winning or losing of the game is determined based on which score is higher between a total score of cards dealt to the dealer and a total score of cards dealt to the player.

However, when the total score of cards exceeds 21, he or she is disqualified. Therefore, the player plays the game for the purpose of gaining a higher possible score insofar as the total score of cards does not exceed 21. In Blackjack, there is a rule as follows as a method for counting scores of cards. Namely, an ace is counted as 1 or 11, a picture card is counted as 10, and each of the other cards with number is counted as its number.

Specifically, the game progresses as follows. First, a BET is accepted. Two cards each are then dealt to the dealer and the player having placed the BET. Each player selects any of actions “hit”, “stand”, “split” and “double” to take, upon looking at the cards dealt to him or her. Selecting “hit” indicates requesting for another card. Selecting “stand” indicates not requesting for another card. Selecting “split” indicates splitting the initially dealt two cards in the case that the two cards have the same rank, and playing separate games by supplying a new card to each split card. Selecting “double” indicates doubling the BET amount and requesting for another card. The player’s selecting one of the above four types of actions is hereinafter referred to as a BET selection. When the BET selections by all the players in the game are completed, the dealer hits a card until the total score of the dealer’s cards becomes 17 or more. When the total score of the dealer’s cards becomes 17 or more, the total score of the dealer’s cards is compared with that of the player’s cards to determine winning or losing of the game. When the player wins, the player can newly acquire an amount corresponding to the BET amount. On the other hand, when the player loses, the player loses the amount corresponding to the BET amount. It is to be noted that, when the initially received cards are an ace and a card with the score of 10 (when Blackjack is established), the score of 21 established by the two cards is stronger as a hand than the score of 21 established by three or more cards. Upon establishment of Blackjack by the player’s cards, the player can newly acquire an amount corresponding to half as much again as the BET amount.

In the following embodiment, Blackjack is executed in which a normal BET and an additional BET are accepted. Here, the normal BET is a BET placed on winning or losing of Blackjack, and the additional BET is a BET placed on the dealer.

When the additional BET is placed on the dealer, the player can receive a game support.

Further, the player having a total number of BETs (sum of the normal BETs and the additional BETs) over a unit number of games (five games) being the largest can select a dealer in a next game from a plurality of dealers.

Further, when satisfying a condition specified by the dealer, the player can receive an offer of a special payout. Part of the additionally bet game media is cumulatively accumulated as a dealer jackpot (hereinafter also referred to as a dealer JP), and the special payout is offered from the dealer JP.

First, processing executed by a main control portion 40 (see FIG. 12) provided in a game machine 1 (see FIG. 2) is described.

Figure 1B:
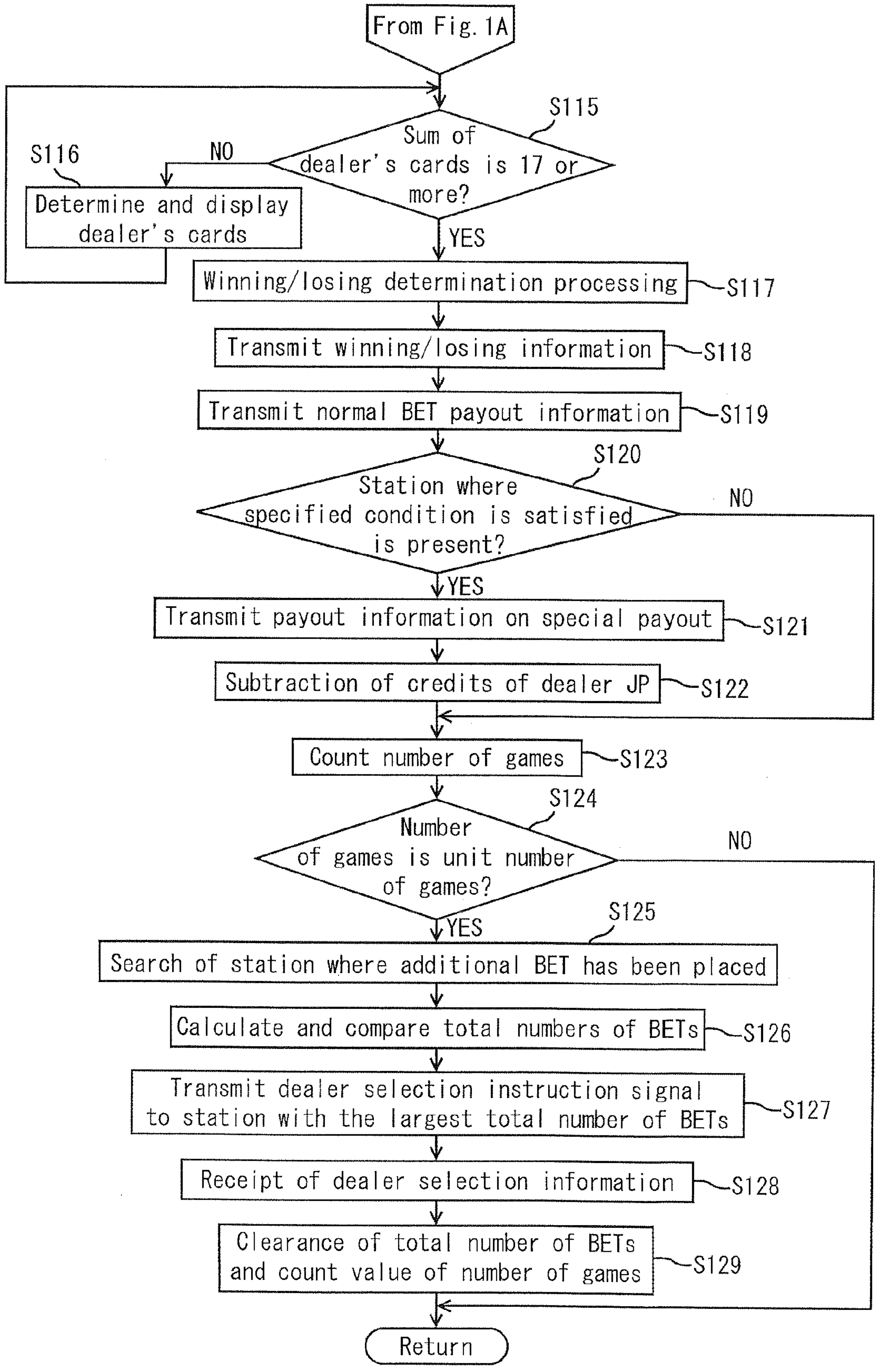
FIG. 1B is a flowchart showing the card game processing executed in the main control portion provided in the gaming machine according to one embodiment of the present invention.

FIGS. 1A and 1B are flowcharts each showing card game processing executed in the main control portion provided in the gaming machine according to an embodiment of the present invention.

Figure 2:
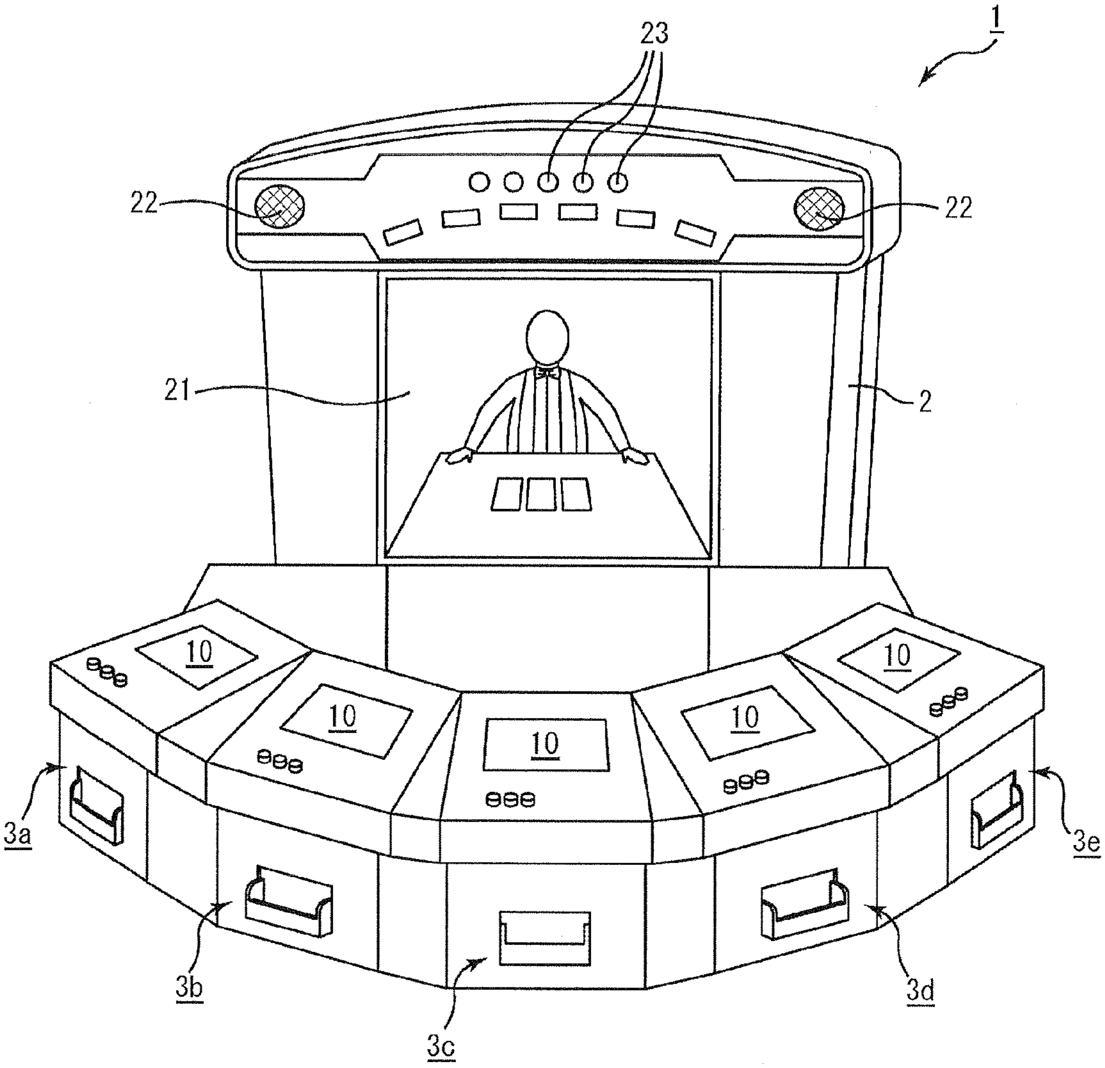
FIG. 2 is a perspective view schematically showing an appearance configuration of the gaming machine according to a present embodiment.

First, in step S101 in FIG. 1A, a CPU 41 (see FIG. 12) provided in the main control portion 40 receives a start signal from any of stations 3 (see FIG. 2). The start signal is a signal that triggers progress of a game of Blackjack in the gaming machine 1.

Next, in step S102, the CPU 41 displays, to a front display 21 provided in the gaming machine 1, a dealer image showing a dealer and an image notifying a specified condition corresponding to the dealer image.

In the present embodiment, a plurality of types of dealer images are prepared, and different specified conditions are respectively associated with the dealer images. At the station 3 where the specified condition corresponding to the dealer image displayed to the front display 21 is satisfied, a special payout is offered from a later-described dealer JP.

Next, in step S103, the CPU 41 receives BET information from the station 3. The BET information is information on BETs, including information showing whether or not the normal BET and the additional BET have been placed and information showing amounts of the normal BET and the additional BET. Further, the CPU 41 receives personal information (name, and the like) of the player inputted at each station 3 concurrently with the BET information.

Next, in step S104, the CPU 41 determines whether or not the additional BET has been placed based on the BET information received in step S103.

When determining that the additional BET has not been placed, the CPU 41 shifts the processing to step S109.

On the other hand, when determining that the additional BET has been placed, in step S105, the CPU 41 cumulatively accumulates into a RAM 42 (see FIG. 12) credits corresponding to 50% of the additionally bet game media as a dealer JP, in association with the dealer image currently displayed to the front display 21.

Next, in step S106, the CPU 41 determines a detail of the game support to be provided to the station 3 where the additional BET has been placed. The game support is to provide a state advantageous for the player in the game, and in the present embodiment, data showing a plurality of types of the game support are prepared for each dealer image. Examples of the detail of the game support may include canceling one of the cards dealt to the player and dealing another card instead.

In step S106, the CPU 41 selects one type out of the plurality of types of details of the game support.

The detail of the game support may be determined based on a game history of the player having placed the additional BET.

Next, in step S107, the CPU 41 transmits a game support instruction signal to the station 3 where the additional BET has been placed. The game support instruction signal is a signal to instruct to execute the game support having the detail determined in step S106 at a predetermined timing.

In the station 3 having received the game support instruction signal, the game support is executed at the predetermined timing.

Next, in step S108, the CPU 41 executes an effect according to the game support determined in step S106 at the same timing as the execution of the game support in the station 3, by means of an image, voice, and light.

It is to be noted that the timing (predetermined timing) for performing the game support may be set during a period when processing of and after step S109 are performed.

Next, in step S109, the CPU 41 determines two cards each to be dealt to the player and the dealer, out of a deck of playing cards, by means of random numbers. The two cards determined to be dealt to the player in step S109 are referred to as player’s cards, and the two cards determined to be dealt to the dealer in step S109 are referred to as dealer’s cards. To the front display 21 provided in the gaming machine 1, one card is displayed face up and the other card is displayed face down as card images showing the two dealer’s cards.

Next, in step S110, the CPU 41 transmits to-be-dealt cards information to the station 3. The to-be-dealt cards information includes information showing types (ranks and suits: Heart, Club, Spade, Diamond) of the cards determined to be dealt to the player and the dealer. In the station 3, the card images showing the two player's cards are displayed to a liquid crystal display 10 (see FIG. 3) based on the received to-be-dealt cards information.

Next, in step S111, the CPU 41 receives selection information from the station 3. The selection information is information on the BET selection made by the player.

Next, in step S112, the CPU 41 determines whether or not to have received stand information as the selection information in step S111. The stand information is information showing that the player has selected "stand" as the BET selection.

When determining not to have received the stand information (step S112: NO), the CPU 41 performs processing corresponding to the BET selection made by the player based on the selection information received in step S111 (step S113). Specifically, upon receipt of information indicating that the player has selected "hit", the CPU 41 determines one card to be dealt to the player by means of a random number, and transmits information on the card as to-be-dealt card information to the station 3 where the player is playing the game. Upon receipt of information indicating that the player has selected "split", the CPU 41 splits two cards displayed to the liquid crystal display 10 of the station 3 where the player is playing the game. The CPU 41 then determines one card each to be newly provided to each split card by means of random numbers and transmits information on the determined cards as to-be-dealt cards information to the station 3 where the player is playing the game. Upon receipt of information indicating that the player has selected "double", the CPU 41 determines one card to be dealt to the player by means of a random number, and transmits information on the card as to-be-dealt card information to the station 3 where the player is playing the game. Upon receipt of the to-be-dealt card information, the card image corresponding to the to-be-dealt card information is displayed to the liquid crystal display 10.

After executing the processing of step S113, the CPU 41 returns the processing to step S111.

In step S112, when determining to have received the stand information (step S112: YES), the CPU 41 displays two card images showing the dealer's cards face up to the front display 21 (step S114).

Next, in step S115 in FIG. 1B, the CPU 41 determines whether or not a total score of the dealt cards is equal to or more than the score of 17.

When determining that the total score of the dealer's cards is less than the score of 17 (step S115: NO), the CPU 41 performs hit processing (step S116). The hit processing is processing of adding one card to the dealer's cards. Specifically, the CPU 41 determines one card by means of a random number and adds the card to the dealer's cards while displaying the card face up to the front display 21. After executing the processing of step S116, the CPU 41 returns the processing to step S115.

When determining in step S115 that the total score of the dealer's cards is equal to or more than the score of 17 (step S115: YES), the CPU 41 executes winning/losing determination processing (step S117). Specifically, the CPU 41 compares the total number of the dealer's cards with that of the player's cards, and determines which total score is higher, thereby determining winning or losing of the game.

Next, in step S118, the CPU 41 transmits information showing winning or losing determined in step S117 (hereinafter also referred to as "winning/losing information") to the station 3. In the station 3, when the winning/losing information is received, any one of images "Yon won", "You lost" and "Tie" is displayed to the liquid crystal display 10, based on the winning/losing information.

Next, in step S119, the CPU 41 transmits normal BET payout information to the station 3. The normal BET payout information is information showing an amount of credits (game media) to be paid out with respect to the normal BET. Specifically, the CPU 41 transmits information showing credits in amount twice as large as the amount of the normal BET when the player wins, and transmits information showing credits in the same amount as the amount of the normal BET when the game is tied. Further, when the dealer wins, the CPU 41 transmits information showing that the amount of credits to be offered is 0.

Next, in step S120, the CPU 41 determines whether or not the station 3 having satisfied the specified condition notified in step S102 is present, based on the selection information received in step S111 and a result of the processing in step S113. In the present embodiment, the specified condition is the establishment of Blackjack consisting of "Queen of Heart" and "Ace" by player's cards.

It is to be noted that the specified condition is not limited to the above example. It may be a condition regarding the player's cards, a condition regarding the BET amount, or a condition regarding the number of additional BETs.

When determining that the station 3 having satisfied the specified condition is not present, the CPU 41 shifts the processing to step S123.

On the other hand, when determining that the station 3 having satisfied the specified condition is present, in step S121, the CPU 41 transmits payout information on special payout to the station 3 having satisfied the specified condition. The payout information on special payout is information showing an amount of the dealer JP to be offered at the station 3 having satisfied the specified condition. At the station 3 having satisfied the specified condition, coins are paid out in an amount corresponding to 50% of the dealer JP accumulated in association with the dealer image that corresponds to the specified condition.

Next, in step S122, the CPU 41 subtracts credits in an amount shown by the payout information on special payout transmitted in step S121 from the credits of the dealer JP stored in the RAM 42.

Next, in step S123, the CPU 41 executes processing of counting the number of games. Specifically, the CPU 41 adds 1 to a value of the number of games stored in the RAM 42, and stores the obtained value in the RAM 42.

Next, in step S124, the CPU 41 determines whether or not the number of games counted in step S123 has reached a predetermined unit number of games (5 games). When determining that the number of games has not reached the predetermined unit number of games, the CPU 41 completes the present subroutine.

On the other hand, when determining that the number of games has reached the predetermined unit number of games, in step S125, the CPU 41 searches the station 3 where the additional BET has been placed based on the BET information received from the stations 3.

Next, in step S126, the CPU 41 calculates the total number of BETs as the sum of the number of normal BETs and the number of additional BETs over the predetermined unit number of games (5 games) for each station where the additional BET has been placed, and compares the measurement of the calculated total numbers.

Next, in step S127, the CPU 41 transmits a dealer selection instruction signal to the station 3 having the total number of BETs determined to be the largest in step S126. The dealer selection instruction signal is a signal to instruct to accept the selection of the dealer. In the station 3 where the dealer selection instruction signal has been received, a screen for accepting the selection of the dealer is displayed.

Next, in step S128, the CPU 41 receives dealer selection information showing which dealer has been selected from the station 3 where the total number of BETs is the largest.

In the next game, a dealer image shown by the dealer selection information received in step S128 and a specified condition corresponding to the dealer image are displayed to the front display 21.

Next, in step S129, the CPU 41 clears the total number of BETs stored in the RAM 42 and the count value of the number of games (sets the number and the value to 0).

After executing the processing of step S129, the CPU 41 completes the present subroutine.

Next, the gaming machine 1 according to the present embodiment is described.

FIG. 2 is a perspective view schematically showing an appearance configuration of the gaming machine according to the present embodiment.

As shown in FIG. 2, the gaming machine 1 basically includes a main monitor 2 and five stations 3 (stations 3*a* to 3*e*). It is to be noted that, although the case of the gaming machine 1 including a plurality of (five) stations 3 in the present embodiment, the gaming machine may include only one station in the present invention.

The front display 21 is provided at the central portion of the main monitor 2 to which images showing a dealer and cards are displayed. The front display 21 corresponds to the display of the present invention. Above the main monitor 2, there are provided: speakers 22 that output music or an effect sound in accordance with progress of a game being executed on the gaming machine 1; and LEDs 23 lighted at times of a variety of effects.

Figure 3:
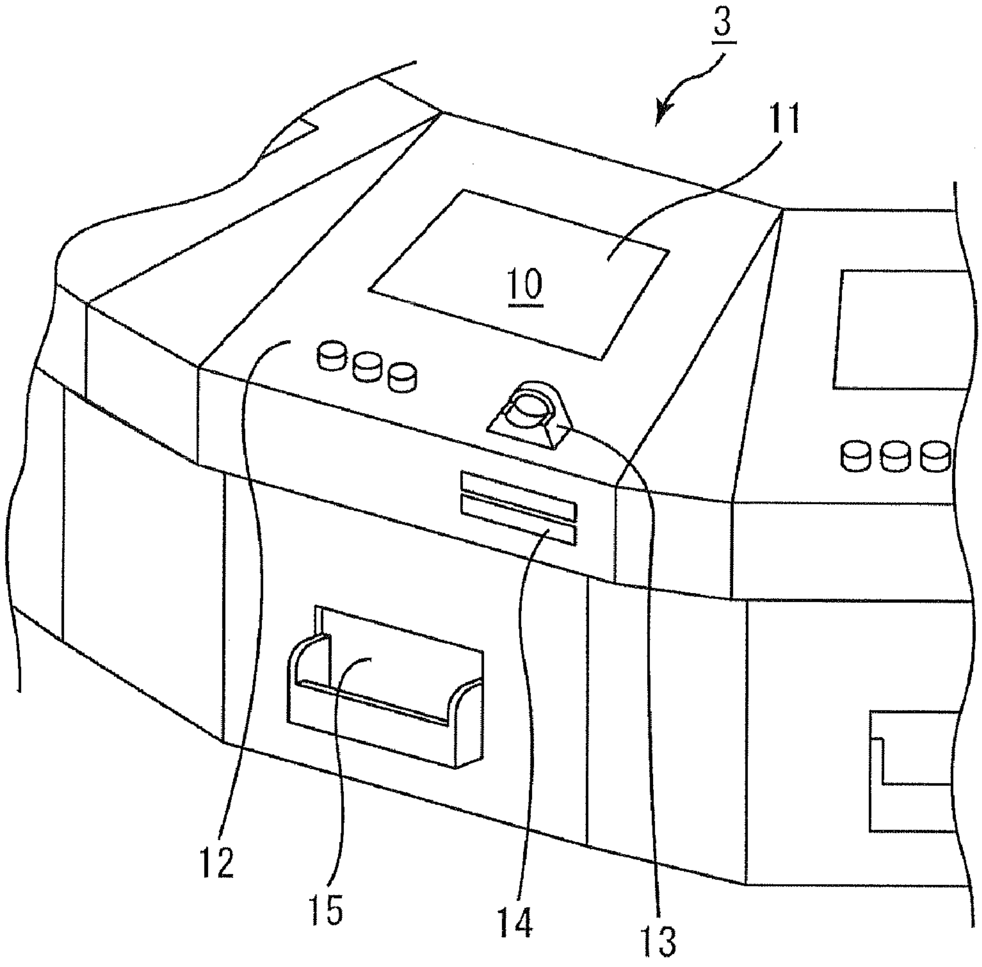
FIG. 3 is a perspective view schematically showing an appearance configuration of the station in the gaming machine.

FIG. 3 is a perspective view schematically showing an appearance configuration of the station in the gaming machine shown in FIG. 2.

As shown in FIG. 3, the later-described liquid crystal display 10 that displays images regarding operations (see FIGS. 9 to 11) and the like is provided at the center of the upper surface of the station 3. Further, a touch panel 11 for inputting operations for placing a BET and the like are provided on the upper surface of the liquid crystal display 10. The touch panel 11 corresponds to the input device in the present invention.

In front of the liquid crystal display 10 are provided operation buttons 12 for performing a payout operation and an input operation of personal information of the player and a coin insertion slot 13 into which coins or medals are inserted.

On the upper right end of the front surface of the station 3, there is provided a bill insertion slot 14 into which a bill is inserted. Below the bill insertion slot 14 is provided a coin payout exit 15, from which coins or medals corresponding to the accumulated credits are paid out to the player when the payout operation is performed.

FIGS. 4 to 8 are views each showing an example of images displayed to a front display provided in the gaming machine.

Figure 4:
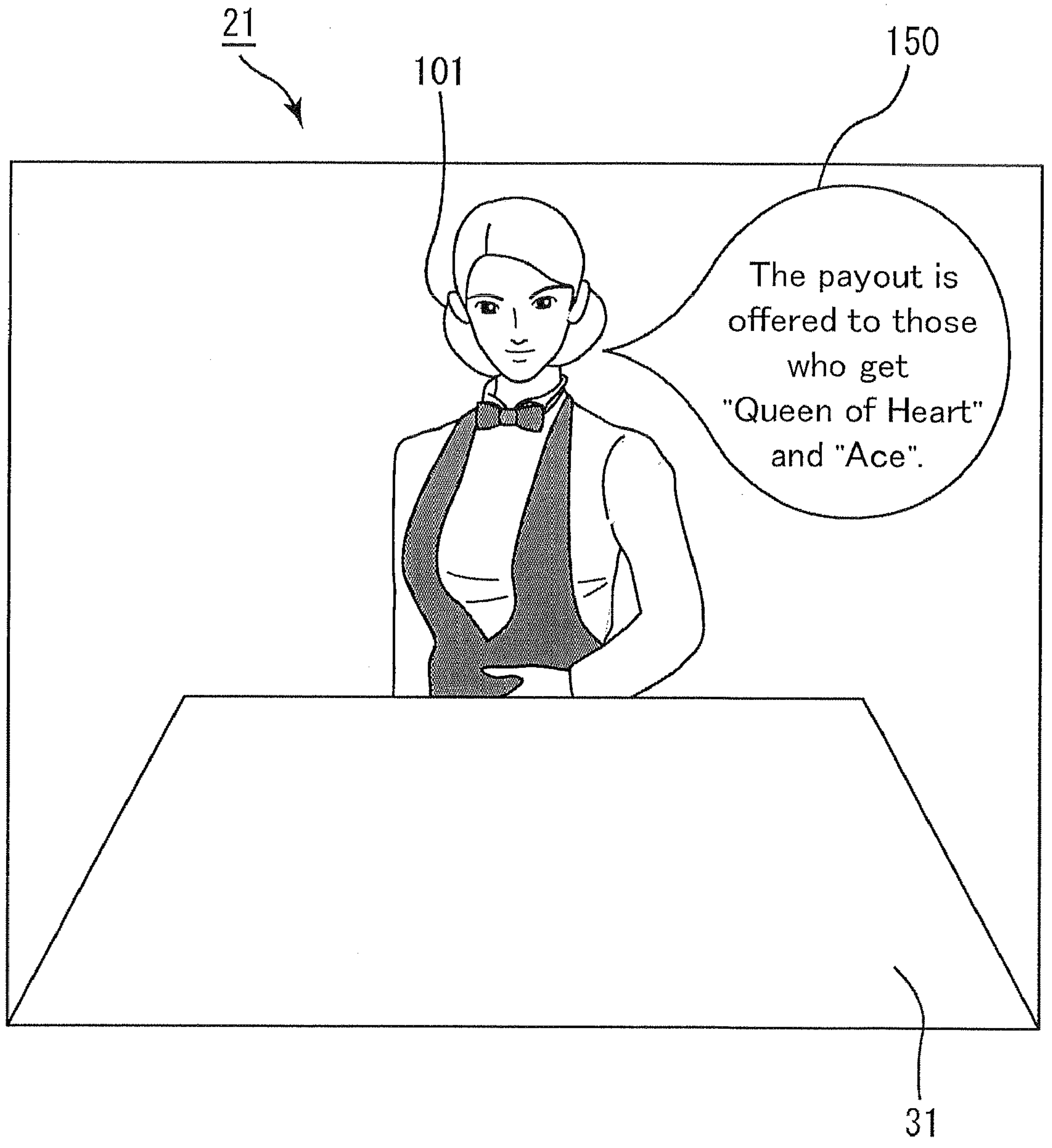
FIG. 4 is a view showing an example of images displayed to a front display provided in the gaming machine.

FIG. 4 shows an example of images displayed to the front display 21 at the start of the game.

As shown in FIG. 4, a dealer image 101 showing a dealer, a table image 31 showing a table, and a speech balloon image 150 showing what the dealer says are displayed to the front display 21.

At the start of the game, a dealer image selected as a dealer image to be displayed at that time is displayed. A specified condition corresponding to the dealer image is then notified. In FIG. 4, the speech balloon image 150 is the image notifying the specified condition, and it is notified that a special payout will be offered when a combination of "Queen of Heart" and "Ace" is established. Simultaneously with a display of the speech balloon image 150, a voice notifying contents of the specified condition is outputted from the speakers 22.

Figure 5:
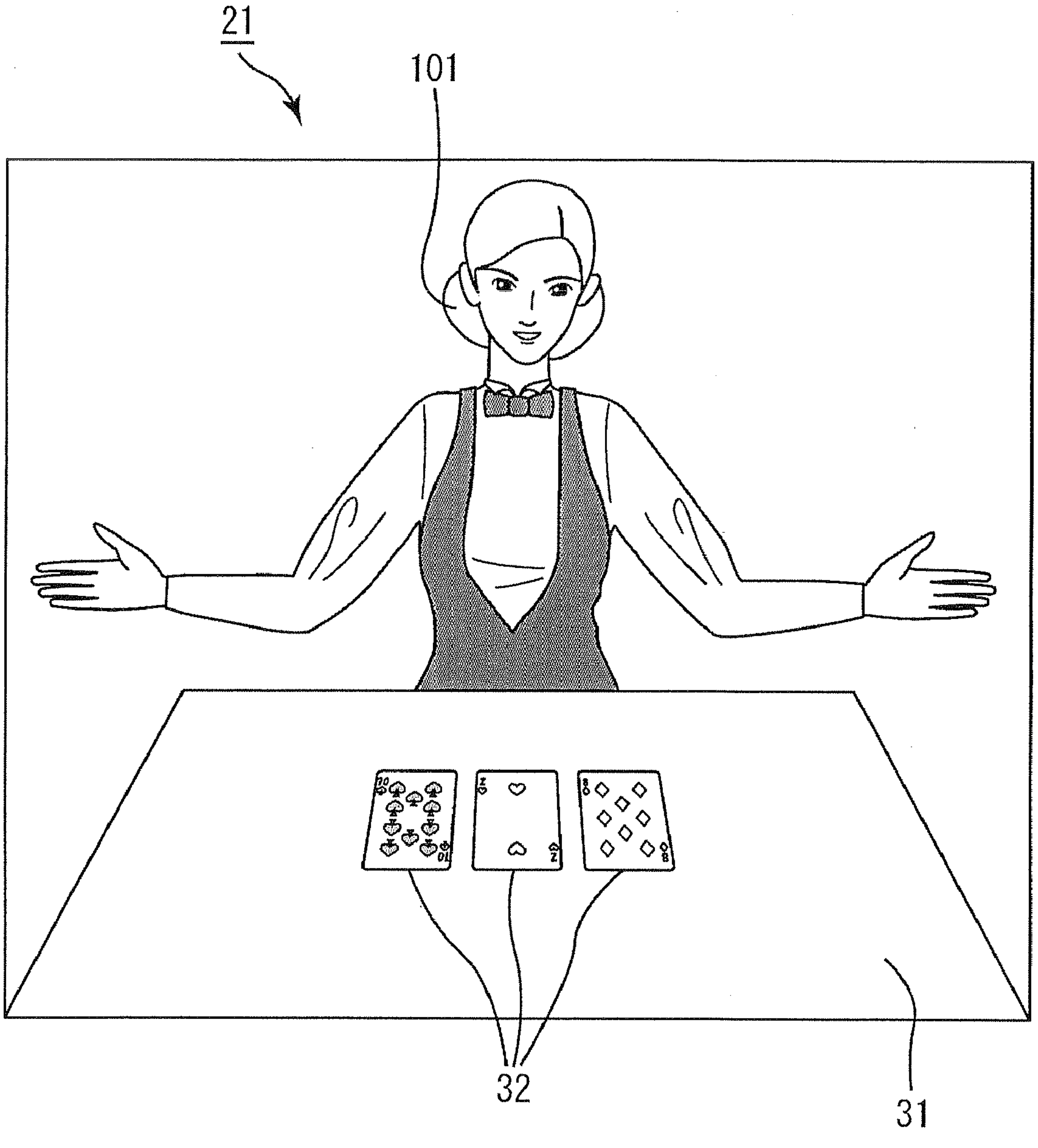
FIG. 5 is a view showing an example of images displayed to a front display provided in the gaming machine.

FIG. 5 is an example of images displayed to the front display 21 during the game.

As shown in FIG. 5, to the front display 21, card images 32 showing dealer's cards are displayed in addition to the dealer image 101 showing the dealer and the table image 31 showing the table. When cards are dealt to the dealer, out of the two card images 32, one card is displayed face up and the other is displayed face down. When the BET selections by all players in the game are completed, all the card images 32 are displayed face up, as shown in FIG. 5.

Figure 6:
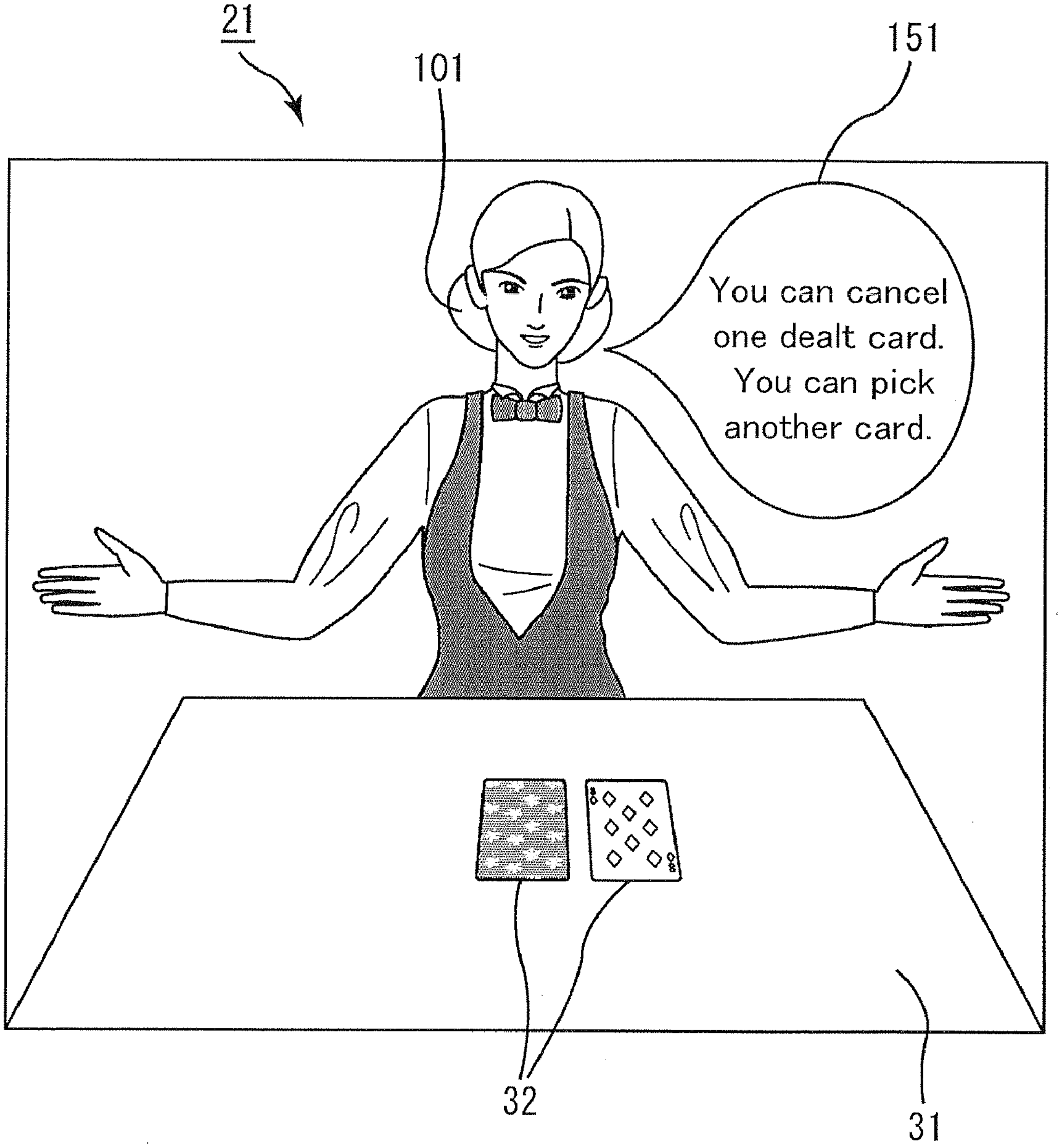
FIG. 6 is a view showing an example of images displayed to a front display provided in the gaming machine.

FIG. 6 shows an example of images displayed to the front display 21 when the game support is executed in the station 3 where the additional BET has been placed.

When the additional BET is placed at any station 3, the game support is executed to the player on the station 3 at a predetermined timing. In the example of FIG. 6, a speech balloon image 151 is displayed which notifies that the player can cancel one dealt player's card and hit another card instead. Simultaneously with a display of the speech balloon image 151, a voice notifying the detail of the game support is also outputted from the speakers 22.

The detail of the game support is not particularly limited, but examples thereof may include: tripling or quadrupling the amount of BET and requesting for another card in the case of playing Blackjack (a variant of the above-mentioned "double"); allowing the player to use initially dealt two cards in another game when those two cards have the same rank; and allowing the player to predict ranks and suits of the dealer's cards displayed face down by getting the cards slightly flipped.

Further, also in a game other than Blackjack, the game support is not limited so long as it provides a game state advantageous for the player by the use of an image and voice.

Moreover, a special effect may be performed, such as an effect of outputting a voice of the dealer calling a name of the player on the station 3 where the additional BET has been placed in the case that the additional BET has been placed, or an effect of displaying an image of the dealer turning his or her eyes to the station 3.

The game support and the special effect as described above correspond to the profit in accordance with the dealer image in the present invention.

Figure 7:
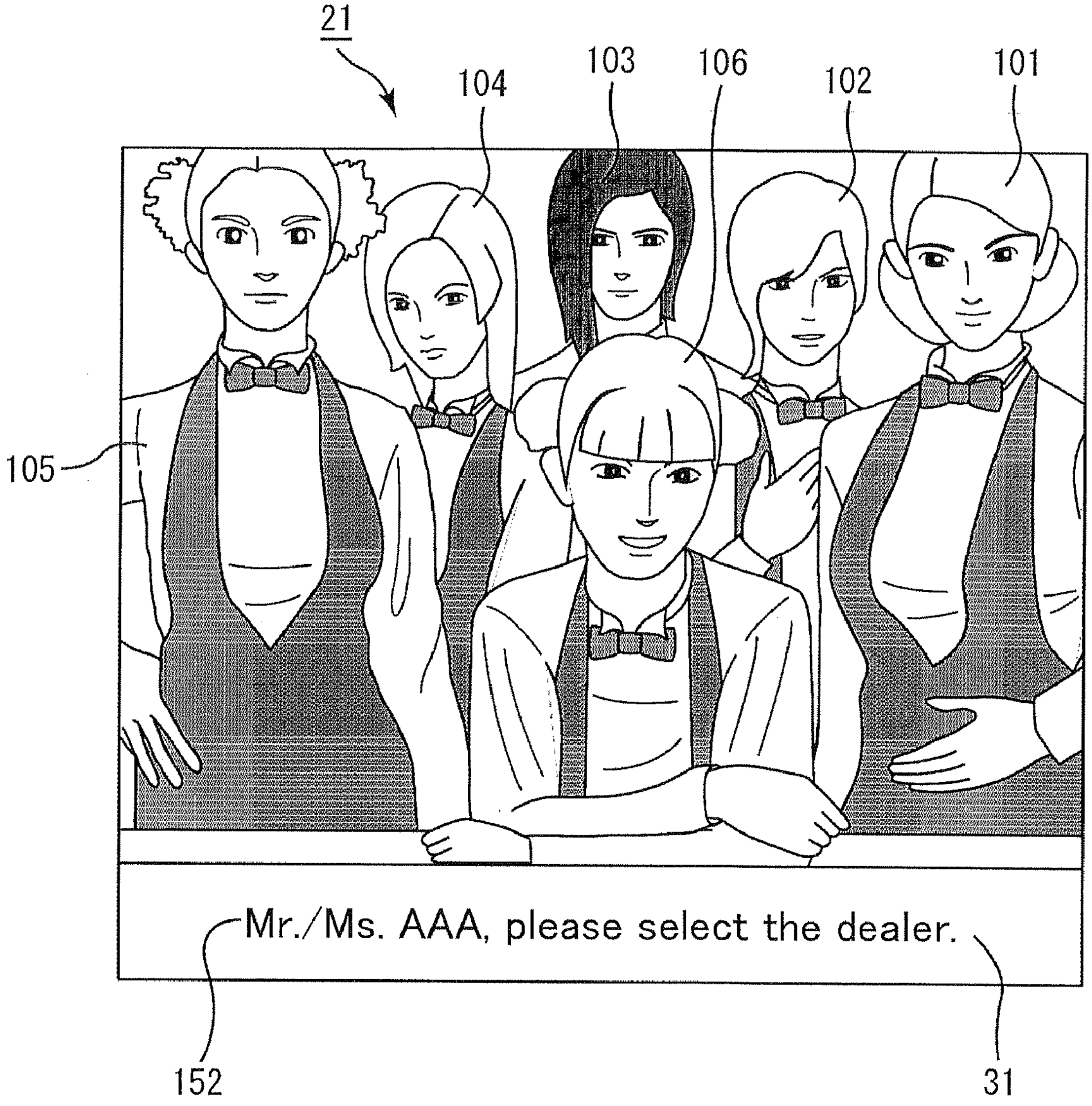
FIG. 7 is a view showing an example of images displayed to a front display provided in the gaming machine.

FIG. 7 is an example of images displayed to the front display 21 at the time of selection of the dealer image.

As shown in FIG. 7, a plurality of dealer images 101 to 106 are displayed to the front display 21, and below those images, an image 152 is displayed which prompts the player on the station 3, where the total number of BETs over a unit number of games is the largest, to select the dealer image. Symbol "AAA" in the image 152 shows a name of the player who has acquired the selection of the dealer image.

Figure 11:
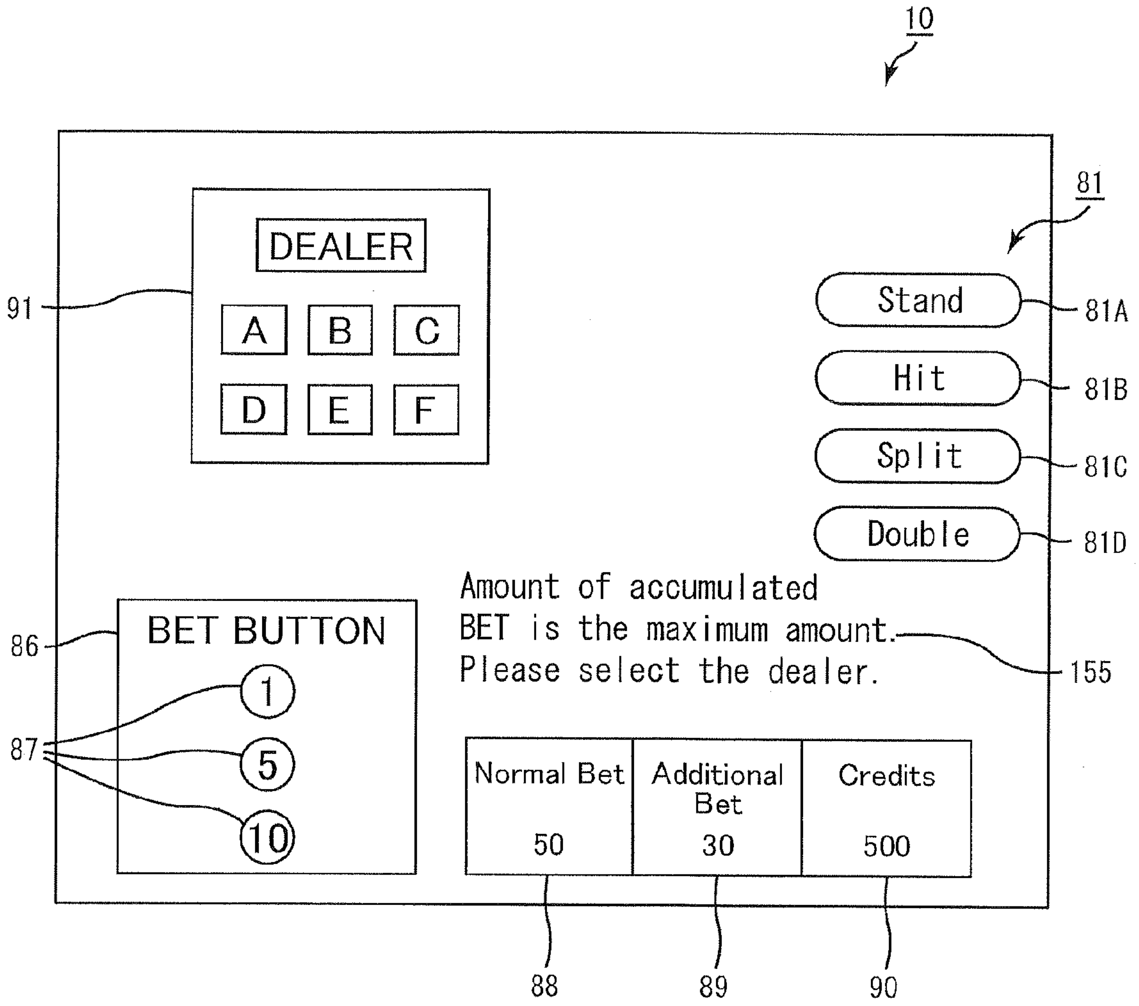
FIG. 11 is a view showing an example of images displayed to a liquid crystal display provided in the station.

Simultaneously, also to the liquid crystal display 10 in the station 3, an image prompting the selection of the dealer image is displayed (see FIG. 11).

Figure 8:
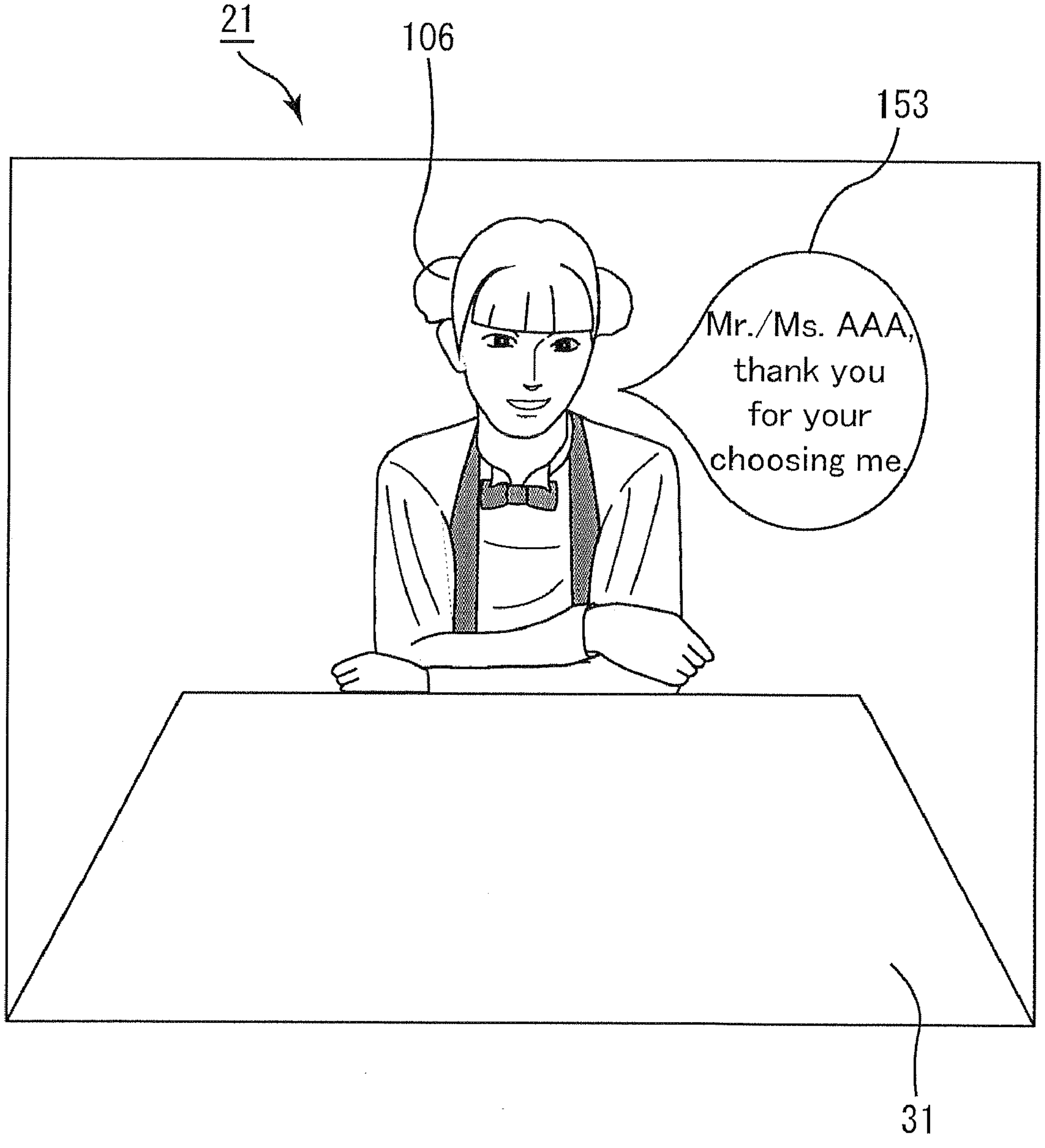
FIG. 8 is a view showing an example of images displayed to a front display provided in the gaming machine.

When the dealer image is selected, the image as shown in FIG. 8 is displayed to the front display 21.

The selected dealer image 106 is displayed in such a manner that the dealer turns his/her eyes to the station 3 where the selection has been made, and a speech balloon image 153 showing words of thanks to the player having made the selection is displayed while a voice expressing the words of thanks is also outputted from the speakers 22.

Figure 9:
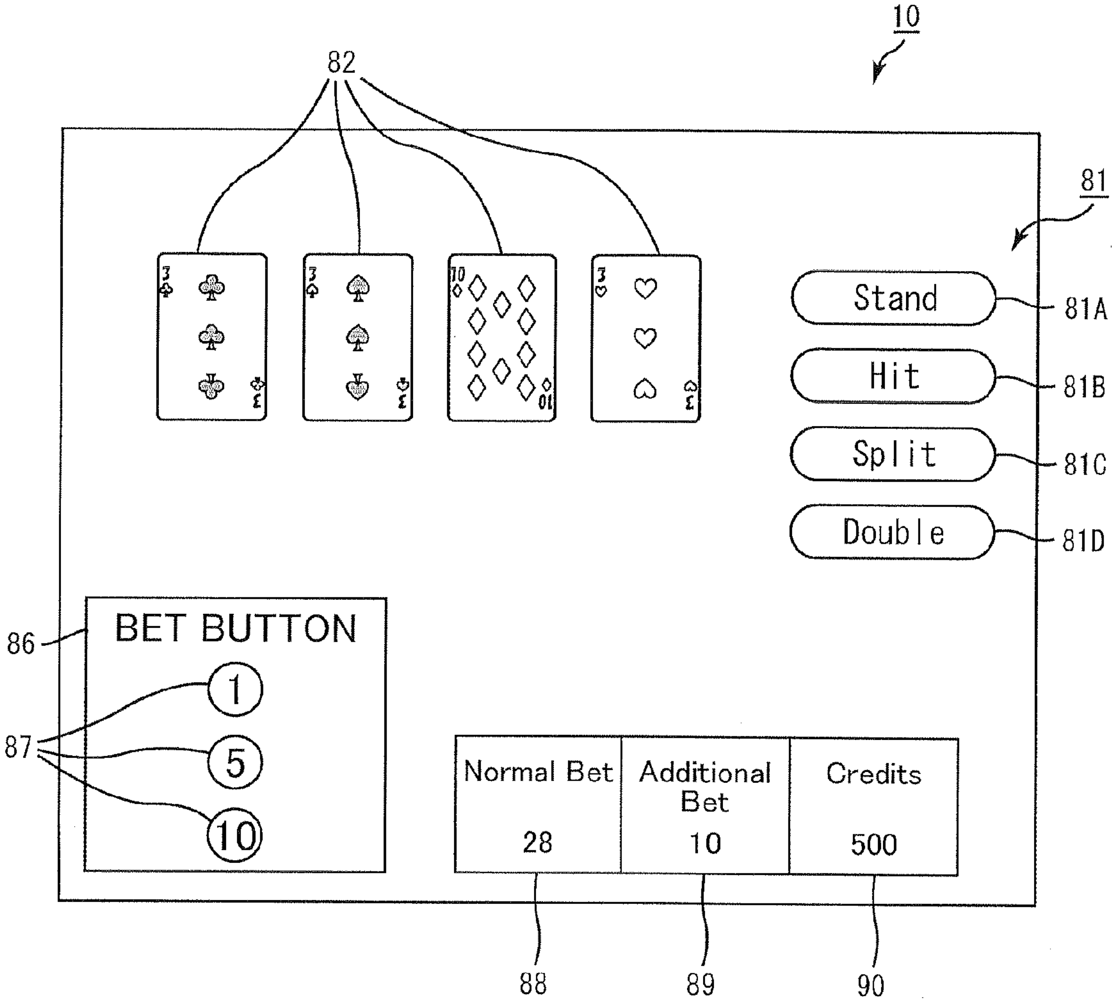
FIG. 9 is a view showing an example of images displayed to a liquid crystal display provided in the station.
Figure 10:
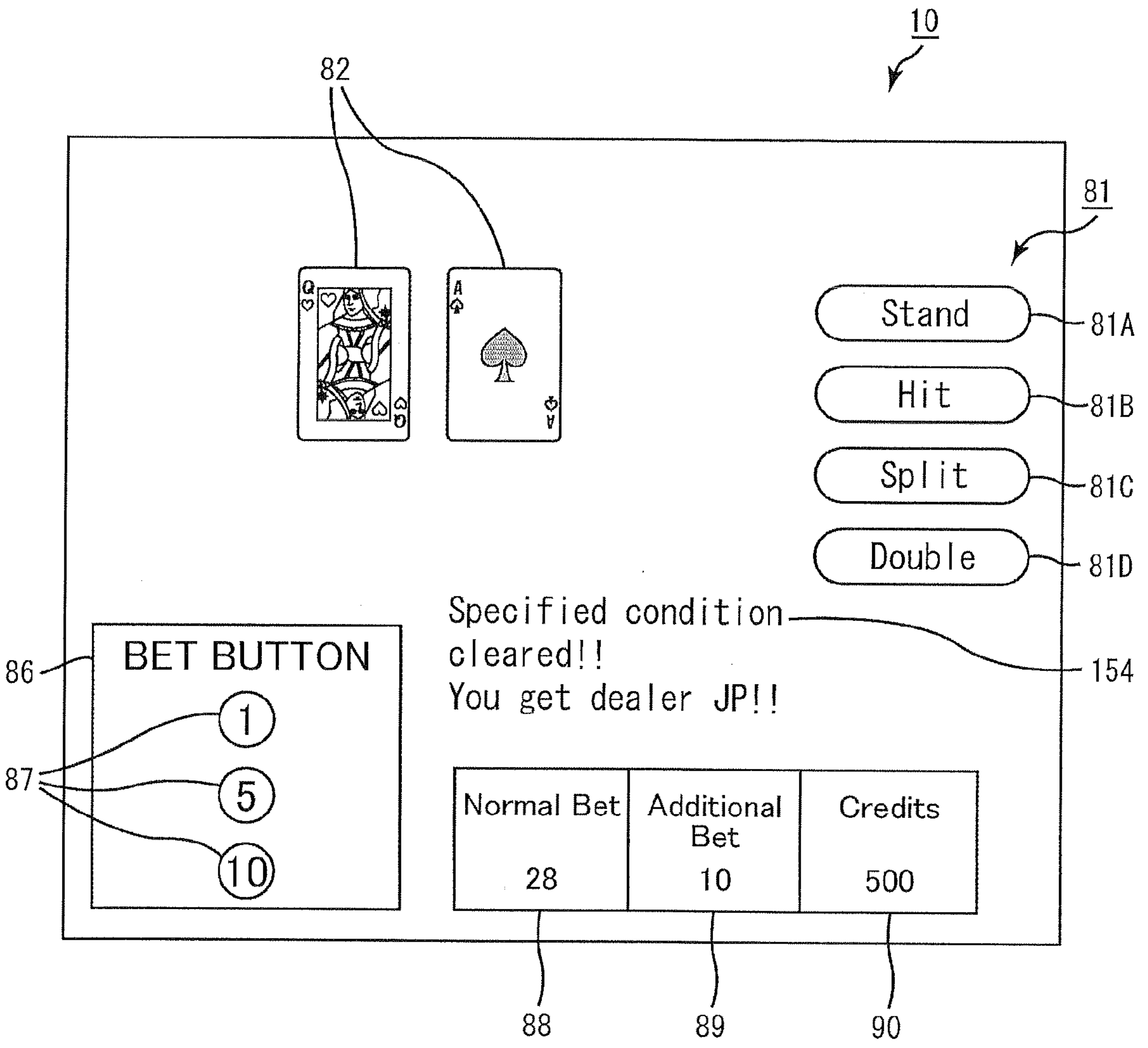
FIG. 10 is a view showing an example of images displayed to a liquid crystal display provided in the station.

FIGS. 9 to 11 are views each showing an example of images displayed to the liquid crystal display provided in the station.

As shown in FIG. 9, on the upper right side of the liquid crystal display 10, BET selection buttons 81 are provided. The BET selection buttons 81 include four types of buttons: a stand button 81A, a hit button 81B, a split button 81C, and a double button 81D.

The stand button 81A is a button for inputting an instruction to select "stand" as the BET selection. The hit button 81B is a button for inputting an instruction to select "hit" as the BET selection. The split button 81C is a button for inputting an instruction to select "split" as the BET selection. The double button 81D is a button for inputting an instruction to select "double" as the BET selection. The player operates each button through the touch panel 11 so as to make the BET selection. To the left of the BET selection buttons 81, card images 82 showing the player's cards are displayed face up.

A BET button display portion 86 is provided under the card images 82. BET buttons 87 for inputting the number of BETs is displayed in the BET button display portion 86. The player operates the BET buttons 87 via the touch panel 11, so as to input the number of normal BETs and the number of additional BETs.

To the right of the BET button display portion 86, a number-of-normal-BETs display portion 88 that displays the number of normal-bet coins is provided. FIG. 9 shows that 28 coins have been bet. It is to be noted that in the case of inputting a BET of 28 coins, the player may operate the BET button 87 "10" twice, the BET button 87 "5" once, and the BET button 87 "1" three times.

To the right of the number-of-normal-BETs display portion 88, a number-of-additional-BETs display portion 89 that displays the number of additionally bet coins is provided. FIG. 9 shows that 10 coins have been bet.

To the right of the number-of-additional-BETs display portion 89, a number-of-credits display portion 90 is provided. FIG. 9 shows that 500 coins have been credited.

FIG. 10 shows an example of images displayed to the liquid crystal display 10 when the specified condition corresponding to the dealer image displayed to the front display 21 is satisfied.

To the lower right of the card images 82 showing the player's cards, an image 154 is displayed which notifies that the specified condition (establishment of Blackjack consisting of "Queen of Heart" and "Ace") has been satisfied and the special payout (dealer JP) will be offered.

FIG. 11 shows an example of images displayed in the station 3 where the total number of BETs over the unit number of games is the largest.

To the liquid crystal display 10, an image 155 prompting the selection of the dealer image is displayed. To the upper left of the image 155, a dealer selection button display portion 91 for selecting the dealer image is displayed. The player selects an alphabet (any of A to F) showing the dealer image in the dealer selection button display portion 91 through the touch panel 11, so as to select the dealer image to be displayed to the front display 21 in the next game.

Figure 12:
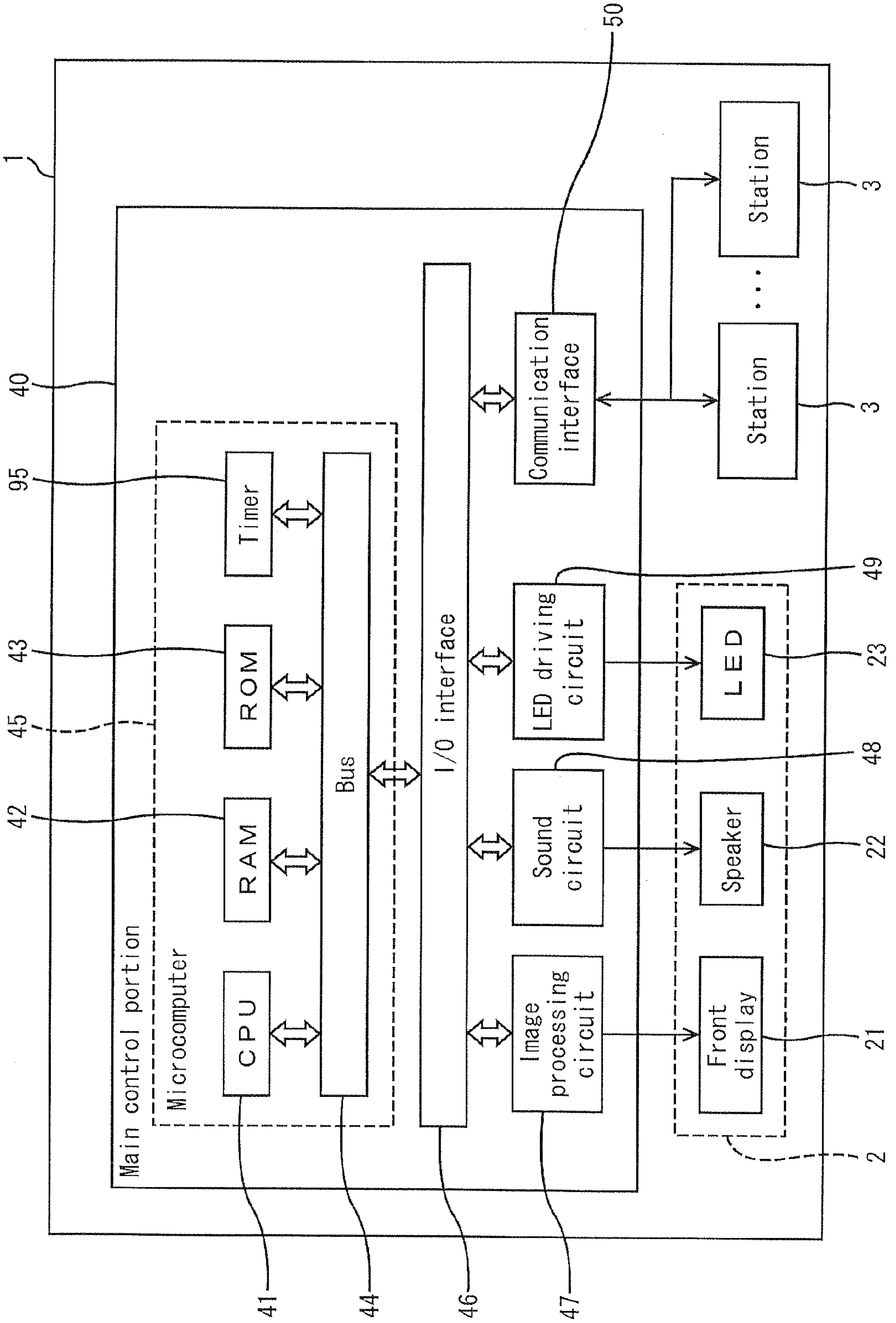
FIG. 12 is a block diagram showing an internal configuration of the gaming machine.

FIG. 12 is a block diagram showing an internal configuration of the gaming machine shown in FIG. 2.

As shown in FIG. 12, the main control portion 40 in the gaming machine 1 has a microcomputer 45 as the core, which basically includes a CPU 41, a RAM 42, a ROM 43, a timer 95, and a bus 44 that is for mutually transmitting data thereamong. The main control portion 40 corresponds to the controller in the present invention.

The ROM 43 stores a variety of programs for performing processing necessary in controlling the gaming machine 1, a data table, and the like. The ROM 43 also stores a plurality of dealer image data each showing the dealer. The ROM 43 corresponds to the memory of the present invention.

The RAM 42 is a memory that temporarily stores a variety of data calculated in the CPU 41.

The RAM 42 also stores the dealer JP, the count value of the number of games, the calculated total number of BETs, and the like.

Moreover, the timer 95 performs time measurement.

Furthermore, the CPU 41 is connected, through an I/O interface 46, to an image processing circuit 47, a sound circuit 48, an LED driving circuit 49, and a communication interface 50.

The image processing circuit 47 is connected with the front display 21 forming the main monitor 2; the sound circuit 48 is connected with the speakers 22 forming the main monitor 2; and the LED driving circuit 49 is connected with the LEDs 23 forming the main monitor 2. The communication interface 50 is connected with five stations 3.

The CPU 41 proceeds with games (Blackjack) that progress on the gaming machine 1, based on game programs (including game programs for Blackjack) stored in the ROM 43 and on a variety of signals received from the stations 3. Further, based on the game programs, the CPU 41 displays an image to the front display 21, outputs a sound from the speakers 22, and lights the LEDs 23. Moreover, the CPU 41 transmits a variety of signals to the respective stations 3 based on the game programs.

Figure 13:
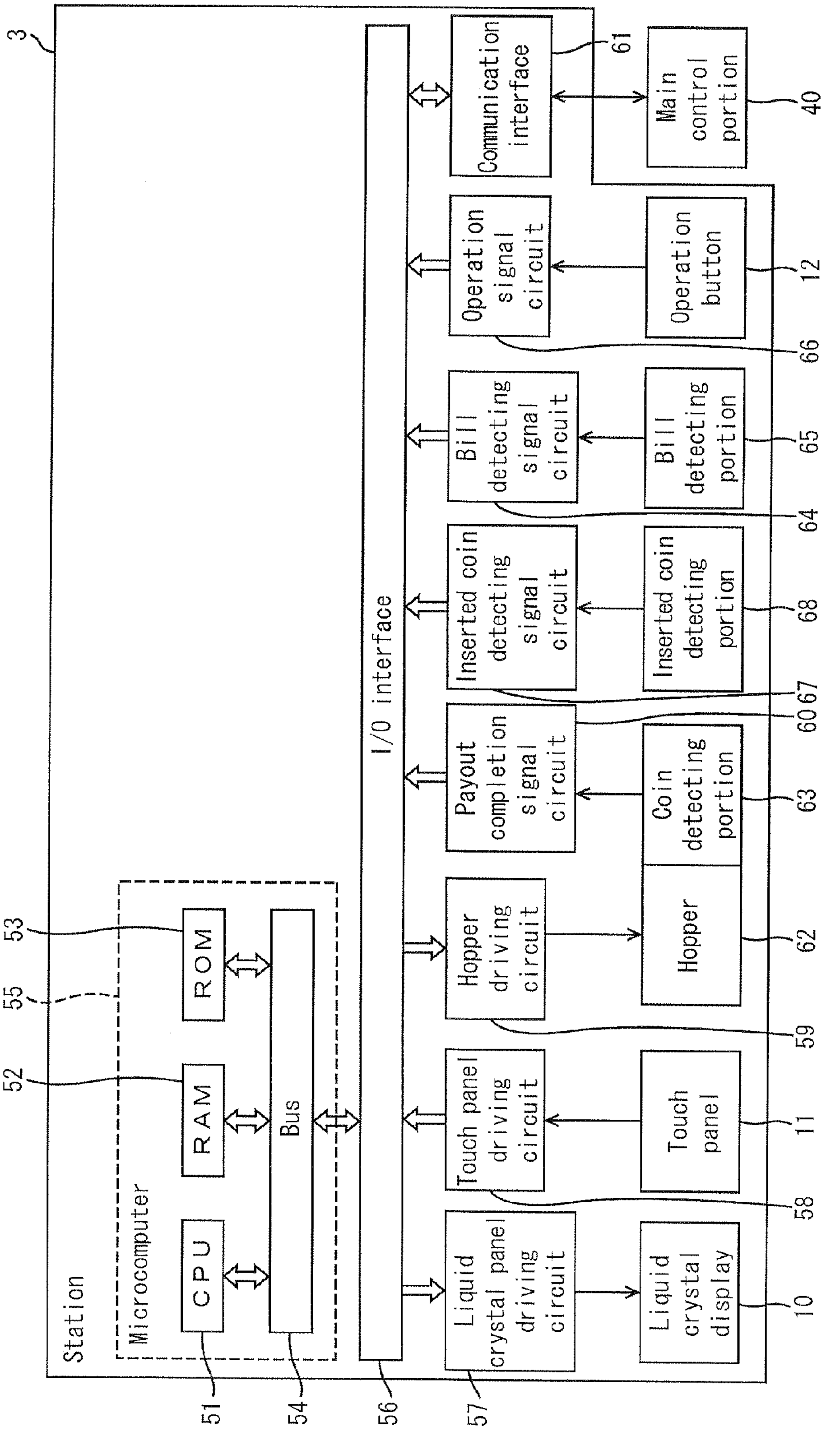
FIG. 13 is a block diagram showing an internal configuration of the station in the gaming machine.

FIG. 13 is a block diagram showing an internal configuration of the station in the gaming machine shown in FIG. 2.

As shown in FIG. 13, the station 3 has a microcomputer 55 as the core, which basically includes a CPU 51, a RAM 52, a ROM 53, and a bus 54 that is for mutually transmitting data thereamong.

The ROM 53 stores a variety of programs for performing processing necessary in controlling the station 3, a data table, and the like. Further, the RAM 52 temporarily stores the number of credits currently accumulated in the station 3 and a variety of data calculated in the CPU 51.

Moreover, the CPU 51 is connected, through an I/O interface 56, to a liquid crystal panel driving circuit 57, a touch panel driving circuit 58, a hopper driving circuit 59, a payout completion signal circuit 60, an inserted coin detecting signal circuit 67, a bill detecting signal circuit 64, an operation signal circuit 66, and a communication interface 61.

The liquid crystal panel driving circuit 57 is connected with the liquid crystal display 10, the touch panel driving circuit 58 is connected with the touch panel 11, the hopper driving circuit 59 is connected with a hopper 62, the payout completion signal circuit 60 is connected with a coin detecting portion 63, the inserted coin detecting signal circuit 67 is connected with an inserted coin detecting portion 68, the bill detecting signal circuit 64 is connected with a bill detecting portion 65, and the operation signal circuit 66 is connected with the operation buttons 12.

The hopper 62 is provided inside the station 3, and pays out coins from the coin payout exit 15 based on a control signal outputted from the CPU 51.

The coin detecting portion 63 is provided inside the coin payout exit 15, and transmits a signal to the CPU 51 when detecting that coins in a predetermined number have been paid out from the coin payout exit 15.

When detecting insertion of coins from the coin insertion slot 13, the inserted coin detecting portion 68 detects the amount of the coins, and transmits a detecting signal showing the detected amount to the CPU 51. The detected coins are stored in the RAM 52, with a predetermined amount as one credit.

The bill detecting portion 65 detects an amount of a bill when receiving the bill, and transmits a signal showing the detected amount to the CPU 51. The detected bill is stored in the RAM 52, with a predetermined amount as one credit.

The operation buttons 12 are buttons for inputting personal information of the player at the start of the game, and performing a payout operation when a payout of coins is determined.

Next, processing performed in the main control portion 40 and the station 3 is described.

Figure 14:
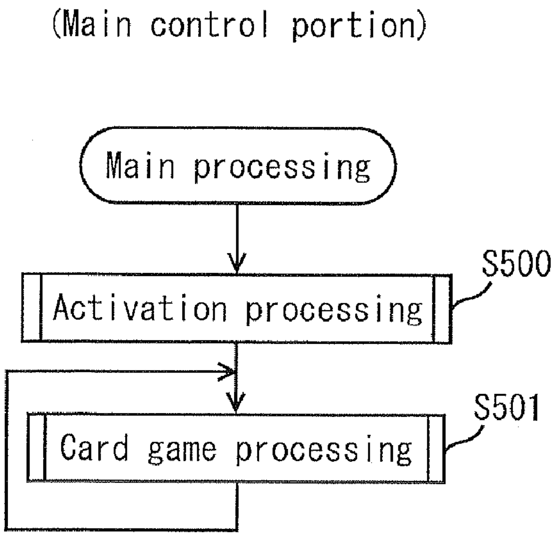
FIG. 14 is a flowchart showing main processing performed in a main control portion and the station.

FIG. 14 is a flowchart showing main processing performed in the main control portion and the station.

The following main processing is performed in the main control portion 40.

The CPU 41 of the main control portion 40 executes activation processing (step S500). The activation processing performed in step S500 is described later using FIG. 12. After executing the activation processing, the CPU 41 executes card game processing (step S501). The card game processing executed in step S501 is the processing that has been described using FIG. 1A and FIG. 1B.

Meanwhile, the following main processing is performed in the station 3.

The CPU 51 of the station 3 executes activation processing (step S600). The activation processing performed in step S600 is described later using FIG. 15. After executing the activation processing, the CPU 51 executes card game processing (step S601). The card game processing executed in step S601 is described later using FIG. 16A and FIG. 16B.

Figure 15:
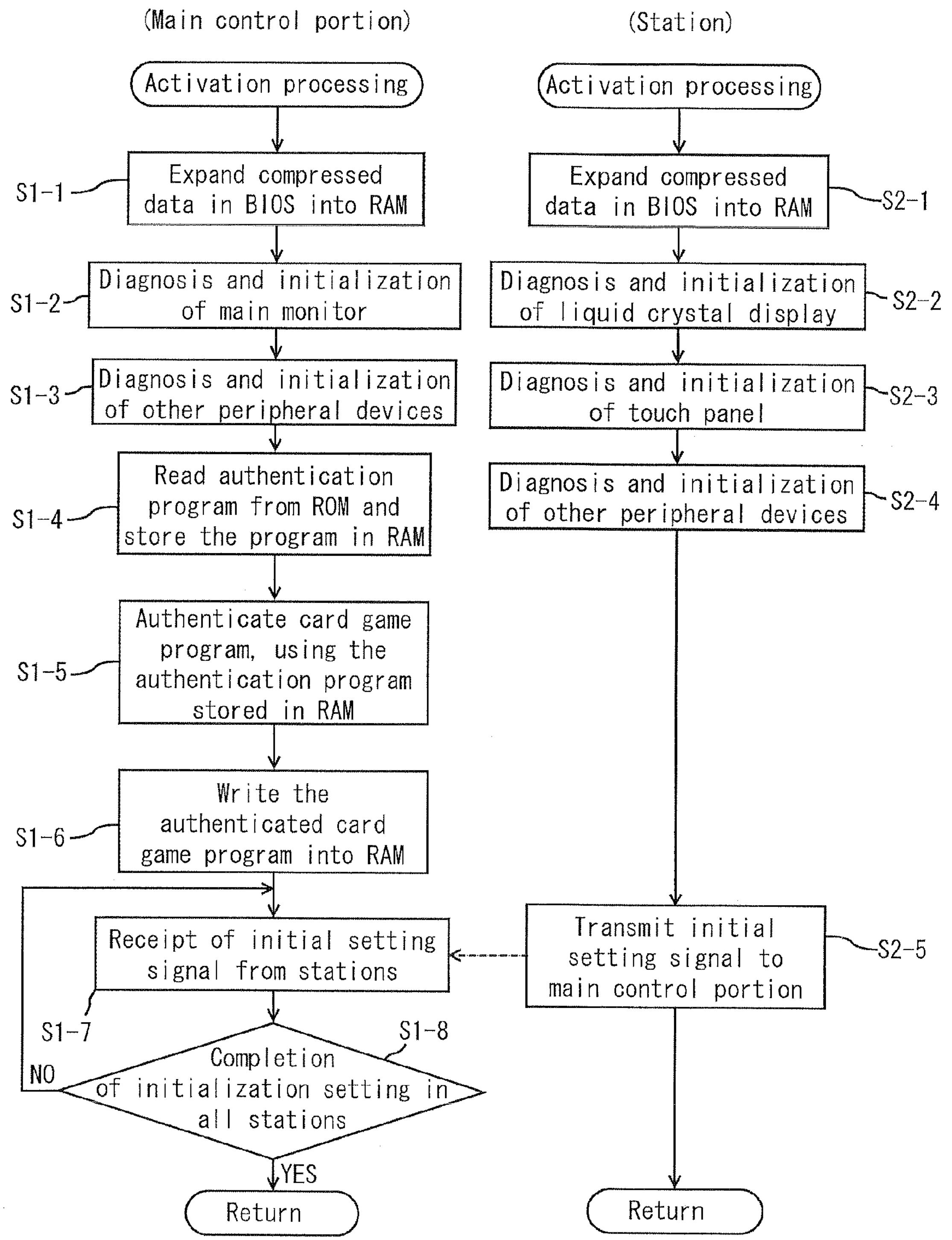
FIG. 15 is a flowchart showing a procedure of activation processing.

FIG. 15 is a flowchart showing a procedure of the activation processing.

This activation processing is processing performed in the main control portion 40 and the station 3, as triggered by power-on (see step S500 and step S600 in FIG. 14).

At power-on, first, the CPU 41 of the main control portion 40 executes a BIOS stored in the ROM 43, and expands compressed data incorporated in the BIOS into the RAM 42 (step S1-1). The CPU 41 then executes the BIOS expanded into the RAM 42, and diagnoses and initializes a variety of peripheral devices.

Specifically, the CPU 41 diagnoses and initializes the main monitor 2 (step S1-2). In this processing, the CPU 41 transmits a request signal to the main monitor 2 and determines whether or not to have received a predetermined response signal, and conducts clearance of a predetermined storage region, and the like.

Next, the CPU 41 diagnoses and initializes the other peripheral devices connected to the CPU 41 (step S1-3).

Next, the CPU 41 reads an authentication program stored in the ROM 43, and also performs processing of storing the read authentication program into the RAM 42 (step S1-4). At this time, the CPU 41 obtains a checksum by ADDSUM system (standard checking function) in accordance with the standard BIOS function of the BIOS, and stores the authentication program into the RAM 42 while performing processing of checking whether or not the storage is performed without an error.

Next, the CPU 41 reads the card game program from the ROM 43. In this case, the CPU 41 reads data constituting the card game program by four bytes at a time. Subsequently, the CPU 41 performs authentication for checking and verifying that the read authentication program is authentic (not broken) in accordance with the authentication program stored in the RAM 42 (step S1-5). When properly completing this authentication processing, the CPU 41 writes and stores the card game program having been an object to be authenticated (having been authenticated) into the RAM 42 (step S1-6).

Meanwhile, the CPU 51 of the station 3 first executes a BIOS stored in the ROM 53, and expands compressed data incorporated in the BIOS into the RAM 52 (step S2-1). The CPU 51 then executes the BIOS expanded into the RAM 52 and diagnoses and initializes a variety of peripheral devices.

Specifically, the CPU 51 diagnoses and initializes the liquid crystal display 10 (step S2-2). In this processing, the CPU 51 transmits a request signal to the liquid crystal panel driving circuit 57, and determines whether or not to have received a predetermined response signal.

Next, the CPU 51 diagnoses and initializes the touch panel 11 (step S2-3). In this processing, the CPU 51 transmits a request signal to the touch panel 11, and determines whether or not to have received a predetermined response signal.

Next, the CPU 51 diagnoses and initializes the other peripheral devices connected to the CPU 51 (step S2-4).

Next, the CPU 51 transmits an initial setting signal to the main control portion 40 (step S2-5). The initial setting signal is a signal showing completion of diagnosis and initialization of the variety of peripheral devices in the station 3.

After executing the processing of step S2-5, the CPU 51 completes the present subroutine.

The CPU 41 of the main control portion 40 receives the initial setting signal transmitted by the station 3 in step S2-5 (step S1-7). Subsequently, the CPU 41 determines whether or not to have received the initial setting signals from all the stations 3 (step S1-8).

When determining that the initial setting signal has not been received from some station 3, the CPU 41 returns the processing to step S1-7. On the other hand, when determining that the initial setting signals have been received from all the stations 3, the CPU 41 completes the present subroutine.

Next, the card game processing performed in the gaming machine 1 is described. However, since the processing performed in the main control portion 40 has already been described in FIG. 1A and FIG. 1B, only processing performed in the station 3 is described here.

Figure 16A:
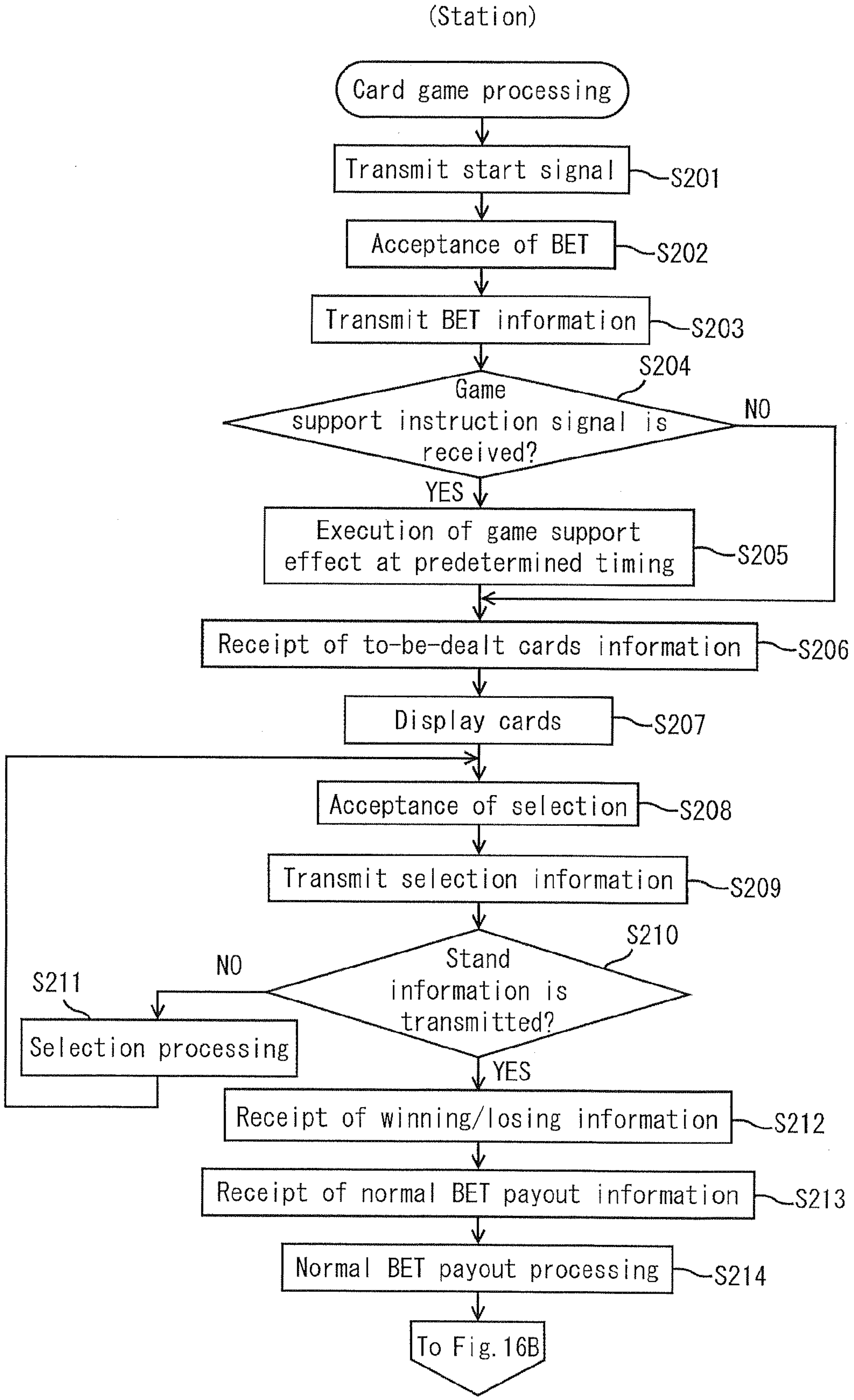
FIG. 16A is a flowchart showing card game processing executed in the station in the gaming machine according to one embodiment of the present invention.
Figure 16B:
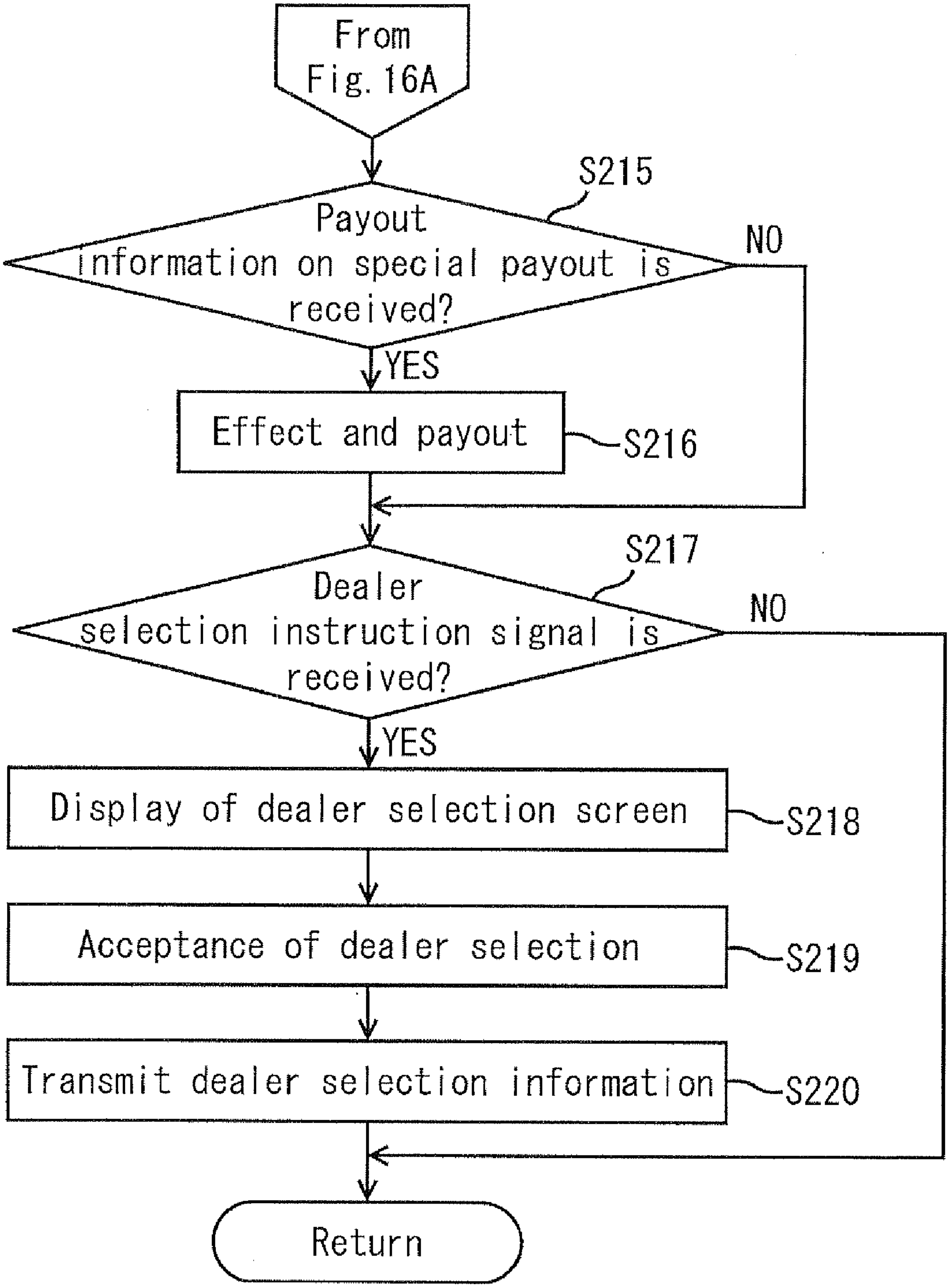
FIG. 16B is a flowchart showing card game processing executed in the station in the gaming machine according to one embodiment of the present invention.

FIG. 16A and FIG. 16B are flowcharts each showing card game processing executed in the station in the gaming machine according to an embodiment of the present invention.

First, in step S201 in FIG. 16A, when the CPU 51 provided in the station 3 receives a signal indicating detection of a contact from the touch panel 11 or an insertion of coins from the inserted coin detecting portion 68, the CPU 51 transmits a start signal to the main control portion 40. Thereby, the processing shown in FIGS. 1A and 1B proceed in the main control portion 40.

Next, in step S202, the CPU 51 accepts inputs of the normal BET and the additional BET. This allows the player to input the normal BET and the additional BET through the touch panel 11 provided in the station 3. Further, in step S202, the CPU 51 accepts an input of personal information (name, and the like) of the player from the operation buttons 12 concurrently with the input of the BET.

It is to be noted that the case of inputting personal information of the player from the operation buttons 12 is described in the present embodiment, but in the present invention, the personal information of the player may be read from a storage medium such as an IC card owned by the player.

Next, in step S203, the CPU 51 transmits BET information as information on the inputted BET to the main control portion 40. Further, at the same time, the CPU 51 transmits the inputted personal information of the player to the main control portion 40.

Next, in step S204, the CPU 51 determines whether or not to have received the game support instruction signal from the main control portion 40.

When determining not to have received the game support instruction signal, the CPU 51 shifts the processing to step S206.

On the other hand, when determining to have received the game support instruction signal, in step S205, the CPU 51 executes at a predetermined timing an effect according to the detail of the game support based on the received game support instruction signal. The CPU 51 performs the effect according to the game support by displaying an image to the liquid crystal display 10, and if necessary, the CPU 51 accepts an input from the touch panel 11.

It is to be noted that the timing (predetermined timing) for performing the game support may be set during a period when processing of and after step S206 are performed.

Next, in step S206, the CPU 51 receives from the main control portion 40 to-be-dealt cards information showing cards to be dealt to the player.

Next, in step S207, the CPU 51 displays card images showing two player's cards to the liquid crystal display 10 based on the to-be-dealt cards information received in step S206.

Next, in step S208, the CPU 51 accepts the BET selection. In accordance with this acceptance, the player makes the BET selection through the touch panel 11.

Next, in step S209, the CPU 51 transmits selection information to the main control portion 40. The selection information is information on the BET selection made by the player in step S208.

Next, in step S210, the CPU 51 determines whether or not to have transmitted stand information in step S209 as the selection information. The stand information is information showing that the player has selected "stand" as the BET selection.

When determining not to have transmitted the stand information (step S210: NO), namely, when the player makes the BET selection other than "stand", the CPU 51 performs processing in accordance with the BET selection made by the player (selection processing) (step S211). Specifically, based on the to-be-dealt cards information transmitted by the main control portion 40 in step S113, the CPU 51 displays a card image corresponding to the to-be-dealt cards information to the liquid crystal display 10. Further, when the player selects "split" or "double" as the BET selection, the CPU 51 performs processing of doubling the BET amount. Namely, the CPU 51 performs processing of subtracting an amount corresponding to the amount of the normal BET inputted in step S202 from the number of credits stored in the RAM 52, and adding that amount to the amount of the normal BET.

After executing the processing of step S211, the CPU 51 returns the processing to step S208.

When determining to have transmitted the stand information in step S210 (step S210: YES), the CPU 51 receives winning/losing information from the main control portion 40 (step S212). Subsequently, the CPU 51 displays to the liquid crystal display 10 any one of images "You won", "You lost" and "Tie" for a predetermined period (10 seconds in the present embodiment) based on the received winning/losing information.

Next, in step S213, the CPU 51 receives normal BET payout information from the main control portion 40. Upon receipt of the normal BET payout information, the CPU 51 stores credit data based on the normal BET payout information into the RAM 52.

Next, in step S214, the CPU 51 pays out credits based on the normal BET payout information received in step S213.

Next, in step S215 in FIG. 16B, the CPU 51 determines whether or not to have received from the main control portion 40 payout information on special payout showing the amount of the dealer JP to be offered at the station 3 having satisfied the specified condition. When determining not to have received the payout information on special payout, the CPU 51 shifts the processing to step S217.

On the other hand, when determining to have received the payout information on special payout, in step S216, the CPU 51 performs an effect according to a payout of the dealer JP (see FIG. 10) while paying out the dealer JP in amount shown by the payout information on special payout.

Next, in step S217, the CPU 51 determines whether or not to have received a dealer selection instruction signal from the main control portion 40. When determining not to have received the dealer selection instruction signal, the CPU 51 completes the present subroutine.

On the other hand, when determining to have received the dealer selection instruction signal, in step S218, the CPU 51 displays a dealer selection screen on the liquid crystal display 10 (see FIG. 11).

Next, in step S219, the CPU 51 accepts the selection of the dealer image on the displayed dealer selection screen. The player can select the dealer image through the touch panel 11.

Next, in step S220, the CPU 51 transmits to the main control portion 40 dealer selection information showing which dealer image has been selected in step S219.

After executing the processing of step S220, the CPU 51 completes the present subroutine.

As above described, the gaming machine 1 according to the present embodiment comprises: the front display 21 (display) capable of displaying an image; a plurality of stations 3 each having the touch panel 11 (input device) and being arranged at a position from which the front display 21 is visible to a player playing a game; thermo 43 storing a plurality of types of dealer image data each showing a dealer image; and the main control portion 40 (controller). The main control portion 40 is programmed so as to execute the processing of (a) displaying the dealer image selected from a plurality of types of the dealer images to the front display 21 based on the dealer image data stored in the ROM 43, (b) accepting a normal BET from the touch panel 11 provided in each of the stations 3, (c) accepting an additional BET different from the normal BET, from the touch panel 11 provided in each of the stations 3, (d) offering a normal payout, after executing the game, based on a result of the game and the normal BET, (e) offering a profit in accordance with the dealer image displayed to the front display 21 in the station 3 where the additional BET has been placed, (f) calculating in each of the stations 3 a total number of BETs as a sum of a number of normal BETs and a number of additional BETs over a predetermined unit number of the games, and (g) accepting an input for selecting the dealer image to be displayed to the front display 21 from the touch panel 11 provided in the station 3 where the total number of BETs is the largest as a result of a comparison of the total number of BETs at each of the stations 3 calculated in the processing (f).

According to the gaming machine 1, the player having placed the largest amount of BETs over the unit number of games can select the dealer image to be displayed to the front display 21. Therefore, it is possible to have the player who wishes to select the dealer image consume many game media.

Further, when the additional BET is placed separately from the normal BET, the profit in accordance with the dealer image displayed to the front display 21 at that time is offered to the station 3 where the additional BET has been placed. This can motivate the player to place the additional BET. Consequently, it is possible to have the player consume more game media.

As thus described, since the player can play a game against the dealer selected by his or her own choice, or receive a profit from the dealer on whom the player has placed the additional BET, it is possible to have the player emotionally attached to the dealer, so as to make the game more interesting. Further, the player capable of placing a large amount of BET can feel superior to other players.

In the present embodiment, the case has been described where the selection of the dealer image can be made in the station 3 where the total number of BETs over a unit number of games is the largest. However, in the present invention, it may be configured to allow the selection of the dealer image at the station 3 where a total number of losses is the largest, the total number of losses being obtained by subtracting a total number of payouts as a total amount of game media offered over a predetermined unit number of games from the total number of BETs. Namely, the player having incurred the largest loss over the unit number of games may be allowed to select the dealer image.

Further, in the present embodiment, the case has been described where the game support is executed every time the additional BET is placed. However, in the present invention, the profit may be offered once in every couple of games in which the additional BET has been placed.

Further, in the present embodiment, the case of playing Blackjack as the game has been described, but the game in the present invention is not particularly limited so long as it is a game played by a player against a dealer.

Although the present invention has been described with reference to embodiments thereof, these embodiments merely illustrate specific examples, not restrict the present invention. The specific structures of respective means and the like can be designed and changed as required. Furthermore, there have been merely described most preferable effects of the present invention, as the effects of the present invention, in the embodiments of the present invention. The effects of the present invention are not limited to those described in the embodiments of the present invention.

Further, in the aforementioned detailed description, characteristic portions have been mainly described, for ease of understanding the present invention. The present invention is not limited to the embodiments described in the aforementioned detailed description, but can be also applied to other embodiments over a wider range of applications. Further, the terms and phrases used in the present specification have been used for clearly describing the present invention, not for limiting the interpretation of the present invention. Further, those skilled in the art will easily conceive other structures, systems, methods and the like which are included in the concept of the present invention, from the concept of the present invention described in the present specification. Accordingly, the description of the claims is intended to include equivalent structures that fall within the technical scope of the invention. Further, the abstract aims at enabling engineers and the like who belong to the present technical field but are not familiar with the patent office and public institutions, the patent, law terms and technical terms to immediately understand the technical content and the essence of the present application through brief studies. Accordingly, the abstract is not intended to restrict the scope of the invention which should be evaluated from the description of the claims. It is desirable that literatures and the like which have been already disclosed are sufficiently studied and understood, in order to sufficiently understand the objects of the present invention and the specific effects of the present invention.

In the aforementioned detailed description, there has been described processing to be executed by computers. The aforementioned description and expressions have been described for the sake of enabling those skilled in the art to understand the present invention most effectively. In the present specification, each step for deriving a single result should be understood to be self-consistent processing. Further, each step includes transmission, reception, recording and the like of electric or magnetic signals. Although, in the processing at each step, such signals have been expressed as bits, values, symbols, characters, terms, numerical characters and the like, it should be noticed that they have been merely used for convenience of description. Further, although the processing at each step was described using expressions common to human behaviors in some cases, the processes described in the present specification are to be executed by various types of devices, in principle. Further, other structures required for conducting each step will be apparent from the aforementioned description.

What is claimed as new and desired to be secured by Letters Patent of the United States is:

1. A gaming machine comprising:

a display capable of displaying an image;

a plurality of stations each having an input device and being arranged at a position from which said display is visible to a player playing a game;

a memory storing a plurality of types of dealer image data each showing a dealer image; and a controller, said controller programmed so as to execute the processing of (a) displaying the dealer image selected from a plurality of types of said dealer images to said display based on said dealer image data stored in said memory, (b) accepting a normal BET from said input device provided in each of said stations, (c) accepting an additional BET different from said normal BET, from said input device provided in each of said stations, (d) offering a normal payout, after executing said game, based on a result of said game and said normal BET, (e) offering a profit in accordance with the dealer image displayed to said display in the station where said additional BET has been placed, (f) calculating in each of said stations a total number of BETs as a sum of a number of normal BETs and a number of additional BETs over a predetermined number of games, and (g) accepting an input for selecting the dealer image to be displayed to said display from said input device provided in the station where said total number of BETs is the largest, out of said plurality of stations, as a result of a comparison of the total number of BETs at each of said stations calculated in said processing (f).

2. The gaming machine according to claim 1, wherein said processing (g) is processing of accepting the input for selecting the dealer image to be displayed to said display from said input device provided in the station where said total number of BETs is the largest as a result of the comparison of the total number of BETs at each of said stations calculated in said processing (f), out of the stations where said additional BETs have been placed during said predetermined number of games.

3. The gaming machine according to claim 1 wherein said controller is further programmed so as to execute the processing of (h) cumulatively accumulating a predetermined percentage of additional-bet game media in association with the dealer image displayed to said display, and (i) offering a special payout, at the station having satisfied a condition determined for each of the plurality of types of said dealer images, from game media cumulatively accumulated in association with the dealer image for which said condition is determined.

4. A gaming machine comprising:

a display capable of displaying an image;

a plurality of stations each having an input device and being arranged at a position from which said display is visible to a player playing a game;

a memory storing a plurality of types of dealer image data each showing a dealer image; and a controller, said controller programmed so as to execute the processing of (a) displaying the dealer image selected from a plurality of types of said dealer images to said display based on said dealer image data stored in said memory, (b) accepting a normal BET from said input device provided in each of said stations, (c) accepting an additional BET different from said normal BET from said input device provided in each of said stations, (d) offering a normal payout, after executing said game, based on a result of said game and said normal BET, (e) offering a profit in accordance with the dealer image displayed to said display in the station where said additional BET has been placed, (f) calculating in each of said stations a total number of losses obtained by subtracting a total number of payouts as a total amount of game media offered over a predetermined unit number of games from a total number of BETs as sum of a number of normal BETs and a number of additional BETs over said predetermined number of games, and (g) accepting an input for selecting the dealer image to be displayed to said display from said input device provided in the station where said total number of losses is the largest, out of said plurality of stations, as a result of a comparison of the total number of losses at each of said stations calculated in said processing (f).

5. The gaming machine according to claim 4, wherein said processing (g) is processing of accepting the input for selecting the dealer image to be displayed to said display from said input device provided in the station where said total number of losses is the largest as a result of the comparison of the total number of losses at each of said stations calculated in said processing (f), out of the stations where said additional BETs have been placed during said predetermined number of games.

6. The gaming machine according to claim 4 wherein said controller is further programmed so as to execute the processing of (h) cumulatively accumulating a predetermined percentage of additional-bet game media in association with the dealer image displayed to said display, and (i) offering a special payout, at the station having satisfied a condition determined for each of the plurality of types of said dealer images, from game media cumulatively accumulated in association with the dealer image for which said condition is set.

7. A control method of a gaming machine, said control method comprising the steps of:

(a) displaying a dealer image selected from a plurality of types of said dealer images to a display based on dealer image data showing said dealer image, said dealer image data being stored in a memory;

(b) accepting a normal BET from an input device provided in each station arranged at a position from which said display is visible to a player playing a game;

(c) accepting an additional BET different from said normal BET, from said input device provided in each of said stations;

(d) offering a normal payout, after executing said game, based on a result of said game and said normal BET;

(e) offering a profit in accordance with the dealer image displayed to said display in the station where said additional BET has been placed;

(f) calculating in each of said stations a total number of BETs as a sum of a number of normal BETs and a number of additional BETs over a predetermined number of games; and (g) accepting an input for selecting the dealer image to be displayed to said display from said input device provided in the station where said total number of BETs is the largest, out of said plurality of stations, as a result of a comparison of the total number of BETs at each of said stations calculated in said step (f).

8. The control method of the gaming machine according to claim 7, wherein said step (g) is a step of accepting the input for selecting the dealer image to be displayed to said display from said input device provided in the station where said total number of BETs is the largest as a result of the comparison of the total number of BETs at each of said stations calculated in said step (f), out of the stations where said additional BETs have been placed during said predetermined number of games.

9. The control method of the gaming machine according to claim 7, said control method further including the step of:

(h) cumulatively accumulating a predetermined percentage of additional-bet game media in association with the dealer image displayed to said display; and (i) offering a special payout, at the station having satisfied a condition determined for each of the plurality of types of said dealer images, from game media cumulatively accumulated in association with the dealer image for which said condition is set.

* * * * *